(12) United States Patent
Feria et al.

(10) Patent No.: US 10,249,948 B2
(45) Date of Patent: Apr. 2, 2019

(54) PHASED ARRAY ANTENNAS FOR HIGH ALTITUDE PLATFORMS

(71) Applicant: The Boeing Company, Chicago, IL (US)

(72) Inventors: Ying J. Feria, El Segundo, CA (US); David A. Whelan, Huntington Beach, CA (US); Phillip R. Grajek, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/374,808

(22) Filed: Dec. 9, 2016

(65) Prior Publication Data

US 2018/0166779 A1    Jun. 14, 2018

(51) Int. Cl.
| | |
|---|---|
| *H04B 7/185* | (2006.01) |
| *H04B 7/04* | (2017.01) |
| *H01Q 3/24* | (2006.01) |
| *H01Q 1/24* | (2006.01) |
| *H01Q 1/28* | (2006.01) |
| *H01Q 21/22* | (2006.01) |
| *H04B 7/06* | (2006.01) |

(Continued)

(52) U.S. Cl.
CPC .............. *H01Q 3/24* (2013.01); *H01Q 1/24* (2013.01); *H01Q 1/285* (2013.01); *H01Q 1/286* (2013.01); *H01Q 1/287* (2013.01); *H01Q 3/26* (2013.01); *H01Q 21/22* (2013.01); *H01Q 25/002* (2013.01); *H04B 7/0617* (2013.01); *H04B 7/18506* (2013.01); *H04B 7/18513* (2013.01); *H04B 7/18573* (2013.01)

(58) Field of Classification Search
CPC ...... H04B 7/185; H04B 7/18506; H04B 7/04; H04B 7/0404; H04B 7/0408; H04B 7/18502; H04B 7/18504; H04B 7/02; H04B 7/15; H01Q 21/00; H01Q 21/06; H01Q 25/00

See application file for complete search history.

(56) References Cited

U.S. PATENT DOCUMENTS

| | | | |
|---|---|---|---|
| 7,109,937 | B2 | 9/2006 | Iluz et al. |
| 9,100,086 | B1 * | 8/2015 | Olsen ................. H04B 7/18504 |
| 9,319,466 | B2 * | 4/2016 | Lu ........................... H04L 67/12 |

(Continued)

FOREIGN PATENT DOCUMENTS

| | | |
|---|---|---|
| EP | 2008484 A1 | 11/2007 |
| GB | 2378580 A | 2/2003 |
| WO | 2007124460 A1 | 11/2007 |

OTHER PUBLICATIONS

Extended European Search Report dated Apr. 25, 2018 for application No. 17200763.5, 13 pages.

*Primary Examiner* — Blane Jackson
(74) *Attorney, Agent, or Firm* — Toler Law Group, PC

(57) ABSTRACT

An aircraft includes a fuselage, wings coupled to the fuselage, and a transceiver. The aircraft further includes a plurality of planar phased array antennas coupled to the transceiver and fixedly attached to the fuselage or to at least one of the wings. The plurality of planar phased array antennas include a first planar phased array antenna having a first normal vector and a second planar phased array antenna having a second normal vector. The first normal vector is not parallel to the second normal vector.

25 Claims, 12 Drawing Sheets

(51) Int. Cl.
  *H01Q 3/26*   (2006.01)
  *H01Q 25/00*  (2006.01)

(56) References Cited

U.S. PATENT DOCUMENTS

| | | | |
|---|---|---|---|
| 9,400,329 B2* | 7/2016 | Pillay | G01S 13/90 |
| 9,647,748 B1* | 5/2017 | Mitchell | H04B 7/1851 |
| 2006/0097947 A1* | 5/2006 | McCarville | H01Q 1/286 |
| | | | 343/797 |
| 2008/0218416 A1* | 9/2008 | Handy | H01Q 21/065 |
| | | | 343/700 MS |
| 2011/0034191 A1* | 2/2011 | Leabman | H01Q 1/246 |
| | | | 455/501 |
| 2012/0063522 A1 | 3/2012 | Fuss et al. | |
| 2012/0267472 A1* | 10/2012 | Pratzovnick | B64C 39/024 |
| | | | 244/13 |
| 2014/0168010 A1* | 6/2014 | Mohamadi | H04B 7/18506 |
| | | | 342/357.39 |
| 2015/0015453 A1* | 1/2015 | Puzella | H01Q 21/0025 |
| | | | 343/853 |
| 2016/0013858 A1 | 1/2016 | Jalali et al. | |
| 2016/0134358 A1* | 5/2016 | Jalali | H04B 7/18504 |
| | | | 455/11.1 |
| 2017/0093363 A1* | 3/2017 | Tabatabai | H03H 7/20 |
| 2017/0155442 A1* | 6/2017 | Hommel | H04B 7/18506 |
| 2017/0230103 A1* | 8/2017 | Moffatt | H04B 7/18506 |
| 2018/0019789 A1* | 1/2018 | Hyslop | H04B 7/04 |

\* cited by examiner

US 10,249,948 B2

PHASED ARRAY ANTENNAS FOR HIGH ALTITUDE PLATFORMS

FIELD OF THE DISCLOSURE

The present disclosure is generally related to phased array antennas and high altitude platforms.

BACKGROUND

High Altitude Platforms (HAPs) operate in the stratosphere (e.g., 13 kilometers (km) to 50 km above the surface of the Earth). HAPs may be used for wireless communications. For example, a HAP may include a phased array antenna. In this example, the phased array antenna may have a maximum scan angle and may cause interference or distortion when operating at or near the maximum scan angle. A coverage area of the wireless communications supported by the HAP is related to a maximum scan angle and a distance (e.g., an altitude) of an antenna of the HAP. Conventional techniques for increasing the coverage area include mounting a phased array antenna of the HAP to a mechanical system, such as a gimbal. However, such mechanical systems are heavy and bulky.

SUMMARY

In a particular implementation, an aircraft includes a fuselage, wings coupled to the fuselage, and a transceiver. The aircraft further includes a plurality of planar phased array antennas coupled to the transceiver and fixedly attached to the fuselage or to at least one of the wings. The plurality of planar phased array antennas include a first planar phased array antenna having a first normal vector and a second planar phased array antenna having a second normal vector. The first normal vector is not parallel to the second normal vector.

In some implementations, a method for communicating via a phased array antenna system includes receiving, via a first planar phased array antenna fixedly attached to an aircraft, a first signal corresponding to a communication link. The method further includes transmitting, via a second planar phased array antenna fixedly attached to the aircraft, a second signal corresponding to the communication link, where a first normal vector of the first planar phased array antenna is not parallel to a second normal vector of the second planar phased array antenna.

In another particular implementation, a vehicle includes a plurality of exterior surfaces and a transceiver. The vehicle further includes a plurality of phased array antennas coupled to the transceiver and fixedly attached to at least one of the plurality of exterior surfaces. The plurality of phased array antennas include a first phased array antenna having a first normal vector and a planar phased array antenna having a second normal vector. The first normal vector is not parallel to the second normal vector.

DETAILED DESCRIPTION

Figure 1:
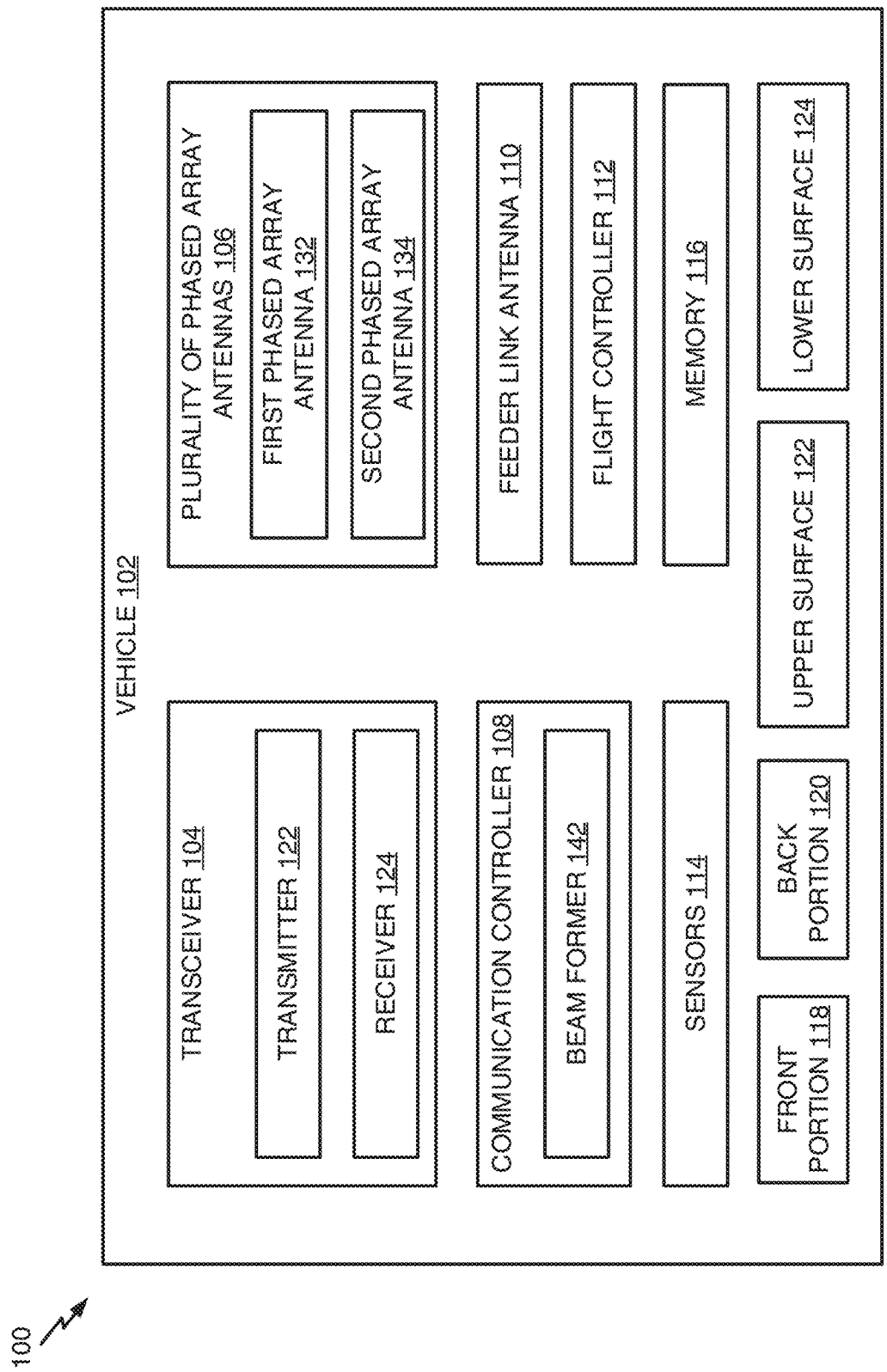
FIG. 1 is a block diagram that illustrates an example of a system for communicating via a plurality of phased array antennas.

Implementations disclosed herein enable wireless communication via a High Altitude Platform (HAP). In particular, one or more systems described herein include a vehicle operating as a HAP, the vehicle including a transceiver, a plurality of phased array antennas, and a communication controller. In a particular implementation, the plurality of phased array antennas may include or correspond to planar phased array antennas that are fixedly attached to the vehicle. The plurality of phased array antennas may include dynamic phased array antennas. For example, the phased array antennas (or beams thereof) may be aimed or adjusted independent of a mechanical system. To illustrate, each array element (e.g., a radiating element or set of elements) of a phased array antenna may be independently controllable and may form and direct a corresponding beam with respect to a face of the phased array antenna. As an illustrative example, each array element may have an adjustable phase shifter that may be used to form and direct a corresponding beam. In another particular illustrative implementation, the plurality of phased array antennas may be conformal (e.g., non-planar) phased array antennas. That is, a first shape of the phased array antenna may substantially correspond to a second shape of a portion of an exterior surface of the aircraft.

The transceiver may include one or more transmitters and one or more receivers. The transceiver may be configured to receive and transmit signals corresponding to multiple different communication links. The transceiver may receive a first signal corresponding to a particular communication link via the plurality of phased array antennas and may be configured to transmit a second signal that corresponds to the particular communication link. The first signal and the second signal may be transmitted and received by a plurality of beams generated by the plurality of phased array antennas.

The communication controller may be configured to adjust the plurality of phased array antennas and beams generated by the plurality of phased array antennas. The communication controller may include a beam former, and the beam former may determine beamforming weights that are used to generate the plurality of beams. For example, the beam former may generate beamforming weights for each beam of the plurality of beams. The beam former may be configured to update or adjust the beamforming weights of each beam based on a flight path of the vehicle. For example, a particular beam may be associated (for a period time) with a particular portion of a service coverage area. The beam former may update or adjust beamforming weights for the particular beam to aim, align, or shape the particular beam on (or over) the particular portion of the service coverage area. This allows the particular beam to transmit and receive signals that correspond to the particular portion of the service coverage area. Thus, the system may enable electronic adjusting of phased array antennas that are fixedly attached to a vehicle and may support transmission and reception of wireless communications from HAPs. By providing transmission and reception of wireless communications, users of a wireless communication system may exchange data (e.g., voice data, video data, audio data, text data, etc.).

By utilizing fixedly attached phased arrays, a vehicle operating as a HAP may transmit and receive signals corresponding to communication links independent of a separate mechanical system. Transmitting and receiving signals from a HAP without the mechanical system (e.g., a gimbal) reduces a size and weight of the vehicle. By reducing the size and weight of the vehicle, the vehicle may be less expensive to manufacture and operate. Additionally, the vehicle may have an increased endurance as compared to vehicles that include a mechanical system to rotate a phased array antenna. Further, as the vehicle weighs less, the vehicle may operate at higher altitudes and have an increased service coverage area.

By operating the vehicle as a HAP, a wireless communication system (e.g., a mobile phone system) may provide (or support) communication links that use less power than communication links that are provided via satellites. Additionally, vehicles operating as a HAP may offer better line of site than terrestrial equipment, such as base stations, and may provide better coverage or service a larger area for communication links than the terrestrial equipment. Furthermore, vehicles operating as a HAP may provide wireless communication service to remote areas (e.g., areas without ground based infrastructure), to areas with topography where ground based infrastructure is not commercially feasible, and/or to areas where infrastructure becomes damaged, such as due to weather.

FIG. 1 illustrates an example of a system 100 that includes a vehicle 102. In a particular implementation of the system 100, the vehicle 102 may include or correspond to an aircraft, an airship (e.g., a blimp), a high attitude balloon, a helicopter, a commercial aircraft, a private plane, or another vehicle, as illustrative, non-limiting examples. The vehicle 102 may be manned or unmanned (e.g., a drone or an unmanned aerial vehicle (UAV)). In some implementations, the vehicle 102 is an aircraft that includes a fuselage and wings. Additionally or alternatively, the vehicle 102 may include a plurality of exterior surfaces. The vehicle 102 may be configured to operate at high altitudes, such as in the stratosphere of the Earth's atmosphere. In some implementations, the vehicle 102 may operate in a particular portion of the stratosphere, such as between 17 kilometers (km) to 22 km above sea level. In a particular implementation, the vehicle 102 may be a hydrogen powered vehicle. For example, the vehicle 102 may be a hydrogen powered aircraft that may include a hydrogen fuel cell to power an electric motor, liquid hydrogen for use in an internal combustion engine, or both. The vehicle 102 may be configured to transmit and receive signals corresponding to wireless communications. For example, the vehicle 102 may be part of a wireless communication system, as further described with reference to FIG. 3.

In the example illustrated in FIG. 1, the vehicle 102 includes a transceiver 104, a plurality of phased array antennas 106, and a communication controller 108. The vehicle 102 may also include a feeder link antenna 110, a flight controller 112, a plurality of sensors 114, and a memory 116. The transceiver 104 may include one or more transmitters and one or more receivers. In a particular example, the transceiver may include a plurality of transmitters and receivers, and each transmitter and receiver may correspond to a particular phased array antenna of the phased array antennas 106. The transceiver 104 may function to enable multiple-input and multiple-output (MIMO) communications. The transceiver 104 may be configured to transmit and receive signals (e.g., communication signals) corresponding to a plurality of communication links via the plurality of phased array antennas 106. A communication link may include or correspond to signals transmitted between two devices, such as user devices, endpoint devices, etc. The communication links may be routed through one or more components of the wireless communication system.

In some implementations, multiple communication links may be concurrently supported. For example, at least a portion of a signal corresponding to a first communication link may be received while a signal corresponding to a second communication link is being transmitted. As another example, at least a portion of a signal corresponding to the first communication link may be received concurrently with a signal corresponding to the second communication link. As yet another example, at least a portion of a signal corresponding to the first communication link may be transmitted concurrently with a signal corresponding to the second communication link.

The plurality of phased array antennas 106 includes a first phased array antenna 132 and a second phased array antenna 134. Although two phased array antennas are illustrated in FIG. 1, in some implementations the plurality of phased array antennas 106 include more than two phased array antennas. Each phased array antenna of the plurality of phased array antennas 106 includes a plurality of elements configured to emit radiation. The plurality of elements may include or correspond to radiating elements, such as dipoles, open-ended waveguides, slotted waveguides, microstrip antennas, helices, spirals, etc., as illustrative, non-limiting examples. A particular set (e.g., one or more) of elements of the plurality of elements may generate a beam (e.g., a radiation pattern). For example, a radiating element and a corresponding phase shifter may generate (e.g., form and direct) the beam. The beam may enable the transceiver 104 to receive and transmit signals corresponding to multiple communication links.

The plurality of phased array antennas 106 may generate a plurality of beams including multiple first beams generated by the first phased array antenna 132 and multiple second beams generated by the second phased array antenna 134. In some implementations, a subset of beams of the multiple first beams may have a different frequency from another subset of beams of the multiple first beams. For example, the multiple first beams may include a first set of beams having a first frequency and a second set of beams having a second frequency. The first phased array antenna 132 may generate the multiple first beams such that the first set of beams are interspersed among the second set of beams to enable frequency reuse of the first frequency to support multiple distinct communication links, as further described with reference to FIG. 5. Although two frequencies have been described as being reused, in other implementations more than two frequencies may be reused, such as 3 frequencies, 4 frequencies, 7 frequencies, 20 frequencies, etc. Additionally, the second phased array antenna 134 may generate the multiple second beams such that a subset of beams of the multiple second beams has a different frequency from another subset of beams of the multiple second beams. For example, the multiple second beams may include a third set of beams having the first frequency and a fourth set of beams having the second frequency. In some implementations, the multiple first beams may be associated with a first range of frequencies (e.g., a frequency band) that is the same as a second range of frequencies associated with the multiple second beams, as further described with reference to FIG. 5.

The plurality of phased array antennas 106 may include or correspond to planar phased array antennas, conformal phased array antennas, or a combination thereof. In a planar phased array antenna, the plurality of elements are arranged along a first axis of a plane and along a second axis of the plane (e.g., a two dimensional array). In some implementations, a first planar phased array antenna may have a different shaped cross section (e.g., a circle, an oval, a square, a rectangle, a triangle, etc.) than a second planar phased array antenna. In a conformal phased array antenna, the plurality of elements may be distributed over (or arranged on) a non-planar surface (e.g., a three dimensional array). In some implementations, the conformal phased array antenna may include or correspond to a spherical or a cylindrical array, as illustrative, non-limiting examples. For example, the plurality of elements may be distributed over a portion of a surface of a sphere or a cylinder.

The plurality of elements may be distributed or arranged uniformly or non-uniformly. For example, in a non-uniform distribution, a first spacing between elements along the first axis may be different from a second spacing between elements along the second axis. As another example, in a non-uniform distribution, a spacing along a particular axis may be non-uniform.

In some implementations, one or more of the plurality of phased array antennas 106 may be fixedly attached to the vehicle 102. For example, the first phased array antenna 132 and the second phased array antenna 134 may be fixedly attached to an exterior of the vehicle 102. To illustrate, when the vehicle 102 is an aircraft, each of the first phased array antenna 132 and the second phased array antenna 134 may be fixedly attached to a portion of a fuselage, to a portion of a wing of the aircraft, or both, as further described with reference to FIG. 2. Fixedly attached, as referred to herein, may refer to a component that is coupled to (e.g., mounted on) an exterior surface of the vehicle 102, coupled to a structure (e.g., a bracket) or device that is coupled to the vehicle 102, or recessed into an exterior surface the vehicle 102. In a particular implementation, the first phased array antenna 132 may be fixedly attached to the vehicle 102 and may have a first normal vector, and the second phased array antenna 134 may be fixedly attached to the vehicle 102 and may have a second normal vector. The first normal vector may not be parallel to the second normal vector. By having non-parallel normal vectors, the first phased array antenna 132 may provide service for a different portion of the service coverage area than the second phased array antenna 134.

In other implementations, one or more of the plurality of phased array antennas 106 may be incorporated into a shape of an exterior surface of the vehicle 102. For example, a conformal phased array antenna may have a first shape (e.g., a non-planar shape) that corresponds to a second shape of a portion of an exterior surface of the aircraft. To illustrate, the elements of the conformal phased array antenna may be distributed over, distributed on, or recessed into the exterior surface of the aircraft, such as an airfoil or fuselage. The exterior surface may be a non-planar surface (e.g., a three dimensional surface). By having conformal phased array antennas, the vehicle 102 may create more lift, create less drag, and may consume less fuel than a vehicle with planar phased arrays.

Each phased array antenna of the plurality of phased array antennas 106 may have a corresponding maximum scan angle (e.g., field of view). In some implementations, a maximum scan angle of a particular phased array antenna of the plurality of phased array antennas 106 may be different from or may be the same as a maximum scan angle of another phased array antenna of the plurality of phased array antennas 106. For example, a first maximum scan angle of the first phased array antenna 132 may be different from (or the same as) a second maximum scan angle of the second phased array antenna 134. Operating the phased array antenna beyond the maximum scan angle may create distortion that is greater than the threshold level and may interfere with transmission and reception of signals by the beams.

Each phased array antenna of the plurality of phased array antennas 106 may have a corresponding normal vector. For example, each phased array antenna may have a planar antenna face that has a corresponding normal vector (e.g., vector that is perpendicular to a plane of the antenna face), as described further with reference to FIG. 2. Additionally, one or more phased array antennas may have a different aspect ratio than another phased array antenna of the plurality of phased array antennas 106. For example, the first phased array antenna 132 may have a first aspect ratio that is different from a second aspect ratio of the second phased array antenna 134. The shape and aspect ratio of a phased array antenna relate to the potential service coverage area of the phased array antenna. As the vehicle 102 includes the plurality of phased array antennas 106, the shape, aspect ratio, and placement of each phased array antenna of the plurality of phased array antennas affects the service coverage area. By having phased array antennas with different aspect ratios, the vehicle 102 can support (or provide) communication links for a larger service coverage area with less coverage area overlap between antennas than a vehicle that has phased array antennas with the same aspect ratio. Additionally, by having phased array antennas with different aspect ratios, the phased array antennas may be attached to more places on the vehicle 102, and the vehicle 102 may support a larger number of phased array antennas. As an illustrative, non-limiting example, a phased array antenna may be attached to a nosecone of the vehicle 102.

One or more of the plurality of phased array antennas 106 may be dynamic. For example, the first phased array antenna 132, the second phased array antenna 134, or both, may include an array of variable phase shifters configured to steer a plurality of beams. One or more of the plurality of phased array antennas 106 may be active or passive. For an active phased array antenna, each set of elements of the phased array antenna may include an amplifier or processor. For a passive phased array antenna, a central amplifier with attenuating phase shifters may control the plurality of elements. The plurality of phased array antennas 106 (and components thereof) may be controlled by the communication controller 108.

The communication controller 108 may be coupled to the transceiver 104 and to the plurality of phased array antennas 106. The communication controller 108 may include or correspond to hardware, software, or a combination thereof. The communication controller 108 may be configured to cause each phased array antenna of the plurality of phased array antennas 106 to generate multiple beams. The communication controller 108 may include a beam former 142. The communication controller 108 may be configured to generate and adjust beamforming weights of the multiple beams via the beam former 142. The beam former 142 may include or correspond to a time domain beam former, a frequency domain beam former, or both. Additionally, the beam former 142 may include or correspond to an adaptive beam former. For example, the beam former 142 may be able to adjust beamforming weights to reduce signal noise (e.g., signal interference and signal cancellation between beams) and to increase transmission and reception quality of communication signals.

The beam former 142 may be configured to determine (e.g., calculate) the beamforming weights based on sensor data, flight path data, service coverage data, or a combination thereof. The beam former 142 may determine beamforming weights for each beam of the plurality of beams. For example, the beam former 142 may determine beamforming weights for each element (or set of elements) of each phased array antenna of the plurality of phased array antennas 106. To illustrate, the beam former 142 may determine first beamforming weights for a first beam produced by a first set of elements of the first phased array antenna 132. The first beamforming weights may be determined based on an altitude of the vehicle 102, an attitude of the vehicle 102, a speed of the vehicle 102, a position of the vehicle 102, a service coverage area, a flight path of the vehicle 102, or a combination thereof.

The beam former 142 may be configured to update (or adjust) beamforming weights based on the sensor data, the flight path data, the service coverage data, or a combination thereof. For example, the beam former 142 may update (or adjust) an alignment, a shape, a gain, or a combination thereof, of the first beam based on the altitude, the attitude, the first portion of the service coverage area, the flight path, or a combination thereof.

To illustrate, the beam former 142 may calculate an expected position (e.g., relative to a service coverage area or a portion of the service coverage area) based on the sensor data and the flight path data. The beam former 142 may determine updated (or adjusted) beamforming weights based on the expected position and may update the current beamforming weight (e.g., first beamforming weights) based on the updated beamforming weights for the future expected position. As another example, the beam former 142 may update beamforming weights based on a current or updated position, altitude, attitude, or a combination thereof, of the vehicle 102. Alternatively, the beam former 142 may adjust beamforming weights by applying coefficients to the current beamforming weight (e.g., first beamforming weights). The coefficients may be calculated based on the sensor data, the flight path data, the service coverage data, or a combination thereof.

The beam former 142 may determine beamforming weights that are used to adjust or update a phase, an amplitude, or both, of a signal emitted by each element to direct a beam. Additionally, the beam former 142 may determine beamforming weights that are used to adjust a shape of the beam such that a radiation pattern of the beam does not interfere with other beams and to limit leakage into surrounding portions of the service coverage area or interference with other beams. The beam former 142 may determine the beamforming weights such that a particular beam is substantially aimed at (or aligned with) a particular portion of the service coverage area to support communication links for the particular portion. As the vehicle 102 operates according to the flight path, beams may need to be transferred (e.g., handed off) from one set of elements to another set of elements. In some implementations, the hand-off is between sets of elements of a single phased array antenna (e.g., the first phased array antenna 132). In other implementations, the hand-off is between sets of elements of different phased array antennas (e.g., the first phased array antenna 132 and the second phased array antenna 134). The communication controller 108 may be configured to transmit control signals to the transceiver 104, the plurality of phased array antennas 106, or both, to initiate a hand-off operation, such as a beam hand-off operation.

Although the beam former 142 is illustrated as being included in the communication controller 108 of the vehicle 102 in FIG. 1, in other implementations the beam former 142 may be separate from the vehicle 102. For example, the beam former 142 may be included in ground equipment and the beamforming weights may be transmitted to the vehicle 102. In one particular implementation, the beamforming weights may be transmitted to the vehicle 102 via a gateway antenna, as described with reference to FIG. 3.

The communication controller 108 may be configured to cause a transition from a first set of elements to a second set of elements (e.g., a beam hand-off) to occur at (or during) a packet boundary. For example, the transition may occur during a time period in between a first packet of a communication link and a second packet of the communication link. To illustrate, the transition may occur at or near an end of the first packet and a beginning of the second packet. In some implementations, the transition may be a "make-before-break" type transition. For example, the second set of elements may generate a beam and establish coverage for a portion of the service coverage area before the first set of elements ceases generating the original beam. To illustrate, the second set of elements generates a second beam to provide (or support) the communication link for a particular portion of a service coverage area before the first set of elements ceases generation of a first beam that provided the communication link for the particular portion of the service coverage area. Additionally or alternatively, the first set of elements may adjust the first beam to provide a second communication link or links for another portion of the service coverage area. In other implementations, the transition from the first set of elements to the second set of elements may be "break-before-make" or may occur at substantially the same time (e.g., simultaneously). In other implementations, the transition (e.g., a beam hand-off) may occur at a frame boundary, during a frame, during a packet, or a combination thereof.

The feeder link antenna 110 may be coupled to the transceiver 104 and to the communication controller 108. The feeder link antenna 110 may be configured to receive signals (and data) from other devices or components of the wireless communication system. The feeder link antenna 110 may be fixed (e.g., fixedly attached) or may be movable (e.g., mounted on a gimbal) with respect the vehicle 102. The feeder link antenna 110 may be attached or mounted on an exterior of the vehicle 102. In some implementations, the feeder link antenna 110 may be attached or mounted on a lower surface of the vehicle 102, such as a fuselage. In other implementations, the feeder link antenna 110 may be mounted on an upper surface of the vehicle 102 or on a nose cone of the vehicle 102. Additionally, the vehicle 102 may include multiple feeder link antennas. For example, the feeder link antenna 110 may be mounted on a lower surface of the vehicle 102 and a second feeder link antenna may be mounted on an upper surface of the vehicle 102.

In some implementations, the feeder link antenna 110 may receive the flight path data, the service coverage data, or both, from the ground equipment. In one particular implementation, the vehicle 102 may receive the flight path data, the service coverage data, or both, via the gateway antenna. The flight path data may indicate the flight path of the vehicle 102, and the service coverage data may indicate the service coverage area and information related to a plurality of cells of the service coverage area, as further described with reference to FIGS. 4-6. In a particular implementation, the service coverage data may be associated with a flight path indicated by the flight path data. When the beam former 142 is located in the ground equipment, the feeder link antenna 110 may receive beamforming weights from the ground equipment via a gateway antenna. In some implementations, the feeder link antenna 110 may receive flight control signals to allow an operator (e.g., a pilot) to operate the vehicle 102 remotely.

The flight controller 112 may be configured to operate the vehicle 102 based on the flight path data. For example, the flight controller 112 may control the wings (e.g., ailerons) of the vehicle 102, as an illustrative, non-limiting example. The flight controller 112 may receive the flight path data via the feeder link antenna 110 or may access the flight path data stored on the memory 116. The flight controller 112 may be configured to control or adjust one or more systems of the vehicle 102 to operate the vehicle 102 according to the flight path indicated by the flight path data. For example, the flight controller 112 may be configured to control or adjust a propulsion system, an avionics system, or both. In a particular implementation, the flight controller 112 may be configured to automatically operate the vehicle 102 according to the flight path independent of human control or input. Additionally or alternatively, the flight controller 112 may operate the vehicle 102 based on the received flight control signals to allow the operator to control the vehicle 102.

The plurality of sensors 114 may be configured to generate sensor data during operation of the vehicle 102. The plurality of sensors 114 may include multiple types of sensors. For example, the multiple types of sensors may include an altitude sensor, a flight speed sensor, an attitude sensor (e.g., one or more sensors to determine roll, pitch, yaw, heading, or a combination thereof), a location sensor (e.g., a global position system (GPS) sensor), or a combination thereof, as illustrative, non-limiting examples. The sensor data may be stored at the memory 116 and may be provided to the flight controller 112.

The memory 116 may include or correspond to a volatile memory, a non-volatile memory, or a combination thereof. The memory 116 may be configured to store data. For example, the memory 116 may store the flight path data and service coverage data. In other implementations, the memory 116 may store other data, such as data based on or including the sensor data. For example, a processor (e.g., a processor of the communication controller 108 or the flight controller 112) of the vehicle 102 may process the sensor data to generate the other data. The other data may include altitude data, attitude data, flight speed data, heading data, weather data, or a combination thereof.

The vehicle 102 further includes a plurality of exterior surfaces including an upper surface 122 and a lower surface 124, as further described with reference to FIG. 2. Additionally, the vehicle 102 includes a front portion 118 and a back portion 120, as further described with reference to FIG. 2.

During operation of the vehicle 102, the vehicle 102 may receive the flight path data and the service coverage data via the feeder link antenna 110 or may access the flight path data from the memory 116. The flight controller 112 of the vehicle 102 may operate the vehicle 102 according to the flight path indicated by the flight path data. The plurality of sensors 114 may generate the sensor data during operation of the vehicle 102.

The beam former 142 may generate the beamforming weights for the plurality of phased array antennas 106 to enable the plurality of phased array antennas 106 to generate a plurality of beams. For example, the first phased array antenna 132 may generate multiple first beams, and the second phased array antenna 134 may generate multiple second beams based on the beamforming weights.

The transceiver 104 may receive and transmit a plurality of signals via the plurality of beams. For example, the transceiver 104 may receive a first signal that corresponds to a particular communication link (e.g., from a first user device) via a first beam of the multiple first beams. The first signal may be received from a first user device or a first base station located within a first portion of the service coverage area. The transceiver 104 may transmit a second signal that corresponds to the communication link via a second beam of the multiple second beams. Alternatively, the second beam may be part of the multiple first beams. The second signal may be transmitted to a second user device or a second base station located within a second portion of the service coverage area. In this example, the vehicle 102 supports a communication link (including the first signal and the second signal) between the first device and the second device. The communication link may allow users of the first device and the second device to exchange data wirelessly.

The beam former 142 may adjust or update the beamforming weights for each beam of the plurality of beams to enable the plurality of phased array antennas 106 to adjust each beam to track a corresponding portion of the service coverage area. Adjusting (or updating) the beamforming weights may include obtaining updated sensor data from one or more sensors of the plurality of sensors 114. For example, the beam former 142 may receive or obtain a second altitude of the vehicle 102, a second attitude of the vehicle 102, or a combination thereof. The beam former 142 may determine second beamforming weights (e.g., beamforming weights at a second time) to provide the first beam to the first portion of the service coverage area based on the second altitude, the second attitude, the location of the first portion of the service coverage area relative to the aircraft, or a combination thereof. The first set of elements may generate an adjusted first beam based on the second beamforming weights. To illustrate, the first set of elements may adjust or update a phase, an amplitude, or both, of an emitted signal (e.g., the beam). The first beam may have a first shape that is different from a second shape of the adjusted first beam. For example, a first radiation pattern of the first beam may be different from a second radiation pattern of the adjusted first beam. Additionally or alternatively, a first angle of the first beam may be different from a second angle of the adjusted first beam.

Thus, a particular beam (e.g., the first beam) may provide continuous coverage and service for the particular portion of the service coverage area for a period of time. For example, the particular beam may provide service for (e.g., support)

one or more communication links for the particular portion of the service coverage area. As the vehicle 102 is operating according to the flight path, the vehicle 102 may move to a location where the first set of elements can no longer provide service to the particular service coverage area, or when providing coverage to the particular service coverage area, the first set of elements may generate interference or distortion that may affect other beams of the first multiple beams. For example, when the location of the vehicle 102 places the first set of elements of the first phased array antenna 132 at (or near) its maximum scan angle, the communication controller 108 may initiate a hand-off procedure to transfer the particular portion of the service coverage area to another set of elements. For example, the communication controller 108 may send a control signal to the transceiver 104, one or more elements of the plurality of phased array antennas 106, or a combination thereof. The control signal may enable execution of a beam hand-off.

As a first illustration, the beam hand-off may be between sets of elements of the same phased array antenna. For example, when the first set of elements and the second set of elements are part of the first phased array antenna 132, the second set of elements may take over providing the communication link for the particular portion of the service coverage area from the first set of elements. To illustrate, the second set of elements may generate or direct the second beam to provide coverage for the particular portion of the service coverage area. The second beam generated by second set of elements may enable the transceiver 104 to receive and transmit signals corresponding to one or more communication links, including the communication link. The first set of elements of the first phased array antenna 132 may cease providing the communication link for the particular portion of the service coverage area. For example, the first set of elements may adjust the first beam to another portion of the service coverage area or may cease generating the first beam. In a particular implementation, the first set of elements ceases providing the communication link after the second set of elements has generated the second beam and established one or more communication links for the particular service coverage area.

As a second illustration, the beam hand-off may be between sets of elements of different phased array antennas. For example, the first set of elements of the first phased array antenna 132 may be providing the communication link for the particular portion of the service coverage area and a set of elements of the second phased array antenna 134 may take over providing the communication link for the particular portion of the service coverage area. The set of elements of the second phased array antenna 134 may generate a third beam to provide the communication link for the particular portion of the service coverage area. The first set of elements of the first phased array antenna 132 may cease providing the communication link for the particular portion of the service coverage area.

In some implementations, the vehicle 102 may receive updated flight path data or service coverage data during operation. The flight controller 112 may begin to operate the vehicle 102 according to the updated flight path data, and the transceiver 104, the communication controller 108, and the beam former 142 may begin to operate based on the updated service coverage data.

In some implementations, the beam former 142 may be located in the ground equipment. In such implementations, the vehicle 102 may transmit the sensor data to the ground equipment via the feeder link antenna 110, and the beam former 142 may generate the beamforming weights based on the received sensor data. The vehicle 102 may receive the beamforming weights via the feeder link antenna 110. The beamforming weights may be used to adjust or update the radiation pattern, the angle, or both, of each beam of the plurality of beams.

In some implementations, the communication controller 108 is further configured to cause an active channel of the first planar phased array antenna 132 to transmit a message to a user device associated with the active channel indicating an upcoming loss of connection in response to determining that no alternative active channel is available on the second planar phased array antenna 134. The message may enable the user device to transition to another HAP vehicle to maintain the connection (e.g., a communication link).

By fixedly attaching a plurality of phased array antennas to the vehicle 102, the vehicle 102 may serve an increased service coverage area without adjusting a maximum scan angle and without including a mechanical positioning or rotating system. Thus, the vehicle 102 may have a reduced weight and size and may have increased performance as compared to vehicles with a mechanical positioning or rotating system. For example, the vehicle 102 may operate longer, operate at higher altitudes, or both.

Figure 2:
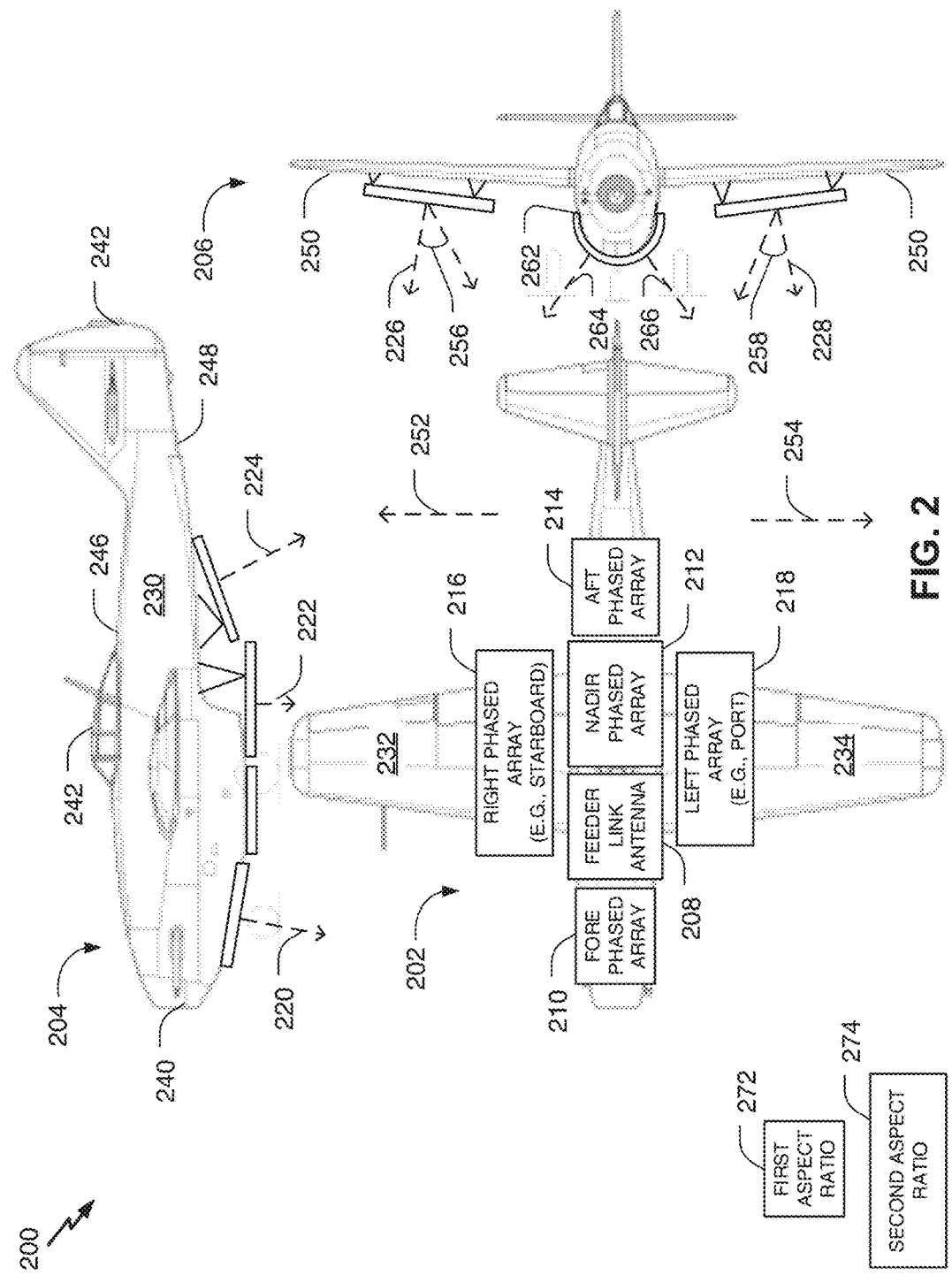
FIG. 2 is a diagram that illustrates a top view, a side view, and a front view of a vehicle that includes a plurality of phased array antennas.

FIG. 2 is a diagram 200 that illustrates a top view 202, a side view 204, and a front view 206 of a vehicle that includes a feeder link antenna 208 and a plurality of phased array antennas 210-218. The vehicle may include or correspond to the vehicle 102 of FIG. 1. The feeder link antenna 208 may include or correspond to the feeder link antenna 110 of FIG. 1. In the diagram 200, the plurality of phased array antennas 210-218 are fixedly attached to the vehicle and the plurality of phased array antennas are planar phased array antennas. In such implementations, the plurality of phased array antennas 210-218 may not be rotatably attached (e.g., attached to the vehicle via a gimbal). The plurality of phased array antennas 210-218 may include or correspond to the plurality of phased array antennas 106 of FIG. 1. Each phased array antenna of the plurality of phased array antennas 210-218 may have a corresponding normal vector. For example, each phased array antenna may have a planar antenna face that has a corresponding normal vector (e.g., vector that is perpendicular to a plane of the antenna face). Additionally, one or more of the plurality of planar phased array antennas may have mutually non-parallel normal vectors. In a particular example, each of the plurality of planar phased array antennas may have mutually non-parallel normal vectors. In another particular example, two or more planar phased array antennas may have parallel or substantially parallel normal vectors. For example, if a size of a planar phased array antenna needed to service a portion of the service coverage area would be too large and not feasible (e.g., interfere with operation of the vehicle, cost-prohibitive, etc.), two smaller planar phased array antennas with substantially similar normal vectors may be used to service the portion of the service coverage area.

The top view 202 of the diagram 200 illustrated in FIG. 2 illustrates a particular arrangement of the feeder link antenna 208, a first phased array antenna 210, a second phased array antenna 212, a third phased array antenna 214, a fourth phased array antenna 216, and a fifth phased array antenna 218. The feeder link antenna 208 and the plurality of phased array antennas 210-218 may be located on the bottom of the vehicle and are shown in the top view 202 for clarity. In other implementations, the feeder link antenna 208 and the plurality of phased array antennas 210-218 could have a different arrangement. Additionally, the vehicle may include more or less feeder link antennas, phased array antennas, or both. The first phased array antenna 210 may include or correspond to a fore phased array antenna. The first phased array antenna 210 may be a planar phased array antenna and may be fixedly attached to a first portion (e.g., a fore portion) of a fuselage 230 of the vehicle.

The second phased array antenna 212 may include or correspond to a nadir (bottom) phased array antenna and may have a circular aspect. The second phased array antenna 212 may be a planar phased array antenna and may be fixedly attached to a second portion (e.g. a middle portion) of the fuselage 230 of the vehicle. The third phased array antenna 214 may include or correspond to an aft (rear) phased array antenna. The third phased array antenna 214 may be a planar phased array antenna and may be fixedly attached to a third portion (e.g. a rear portion) of the fuselage 230 of the vehicle.

The fourth phased array antenna 216 may include or correspond to a right (e.g., starboard) phased array antenna. The fourth phased array antenna 216 may be a planar phased array antenna and may be fixedly attached to a starboard wing 232 of the vehicle. The fifth phased array antenna 218 may include or correspond to a left (e.g., port) phased array antenna. The fifth phased array antenna 218 may be a planar phased array antenna and may be fixedly attached to a port wing 234 of the vehicle. As illustrated in FIG. 2, the fourth phased array antenna 216 and the fifth phased array antenna 218 are be fixedly attached to an under wing portion 250 of the wings 232, 234. Although the plurality phased array antennas 210-218 are illustrated as planar phased array antennas in FIG. 2, in other implementations one or more of the plurality of phased array antennas 210-218 may include or correspond to conformal phased array antennas. In such implementations, the conformal phased array antennas may include multiple normal vectors, and each conformal phased array antenna may include at least one normal vector that is not parallel to at least one normal vector of one of the other phased array antennas.

The side view 204 illustrated in FIG. 2 depicts the feeder link antenna 208, the first phased array antenna 210, the second phased array antenna 212, the third phased array antenna 214, and corresponding normal vectors of the first, second, and third phased array antennas 210-214. To illustrate, the first phased array antenna 210 has a first normal vector 220 oriented in a fore direction, the second phased array antenna 212 has a second normal vector 222 oriented in an downward direction, and the third phased array antenna 214 has a third normal vector 224 oriented in an aft direction. The side view 204 illustrates a fore (e.g., front) portion 240, a middle portion 242, an aft (e.g., rear) portion 244, an upper portion (or surface) 246, and a lower portion (or surface) 248 of the vehicle.

The front view 206 illustrated in FIG. 2 depicts the fourth phased array antenna 216, the fifth phased array antenna 218, and corresponding normal vectors of the fourth and fifth phased array antennas 216, 218. To illustrate, the fourth phased array antenna 216 has a fourth normal vector 226 oriented in a starboard direction 252 and the fifth phased array antenna 218 has a fifth normal vector 228 oriented in an port direction 254. Although FIG. 2 illustrates an aircraft, in other implementations other vehicles capable of operating from a HAP may be used. In a particular implementation, the vehicle may be an airship (e.g., a blimp).

The front view 206 includes an illustrative example of a conformal phased array antenna 262 coupled to the lower portion 248 of the fuselage 230. Although the conformal phased array antenna 262 is illustrated as the one of the phased array antennas 210-214, in other implementations the fourth phased array antenna 216, the fifth phased array antenna 218, or both may be conformal phased array antennas. As illustrated in FIG. 2, the conformal phased array antenna 262 has multiple different (e.g., non-parallel) normal vectors, such as a sixth normal vector 264 and a seventh normal vector 266. Additionally, the front view 206 also illustrates a first maximum scan angle 256 of the right phased array 216 and a second maximum scan angle 258 of the left phased array 218. As illustrated in FIG. 2, the maximum scan angles 256, 258 are azimuth maximum scan angles defined by an angle from a normal vector (e.g., the fourth normal vector 226 and the fifth normal vector 228). The maximum scan angles 256, 258 may be different. For example, the first maximum scan angle 256 may be greater than the second maximum scan angle 258 to account for a bank angle of the vehicle as the vehicle operates.

Phased array antennas of the vehicle may have different aspect ratios. As an illustrative, non-limiting example, a first aspect ratio 272 of a particular phased array antenna (e.g., the first phased array antenna 210, the second phased array antenna 212, the third phased array antenna 214, or a combination thereof) may be different from a second aspect ratio 274 of other phased array antennas (e.g., the fourth phased array antenna 216, the fifth phased array antenna 218, or both).

By fixedly attaching a plurality of phased array antennas such that normal vectors of at least two of the plurality of phased array antennas are non-parallel, the plurality of phased array antennas may service a larger coverage area with less distortion and without the weight and maintenance of a mechanical system (e.g., a gimbal) to rotate and tilt the plurality of phased array antennas.

Figure 3:
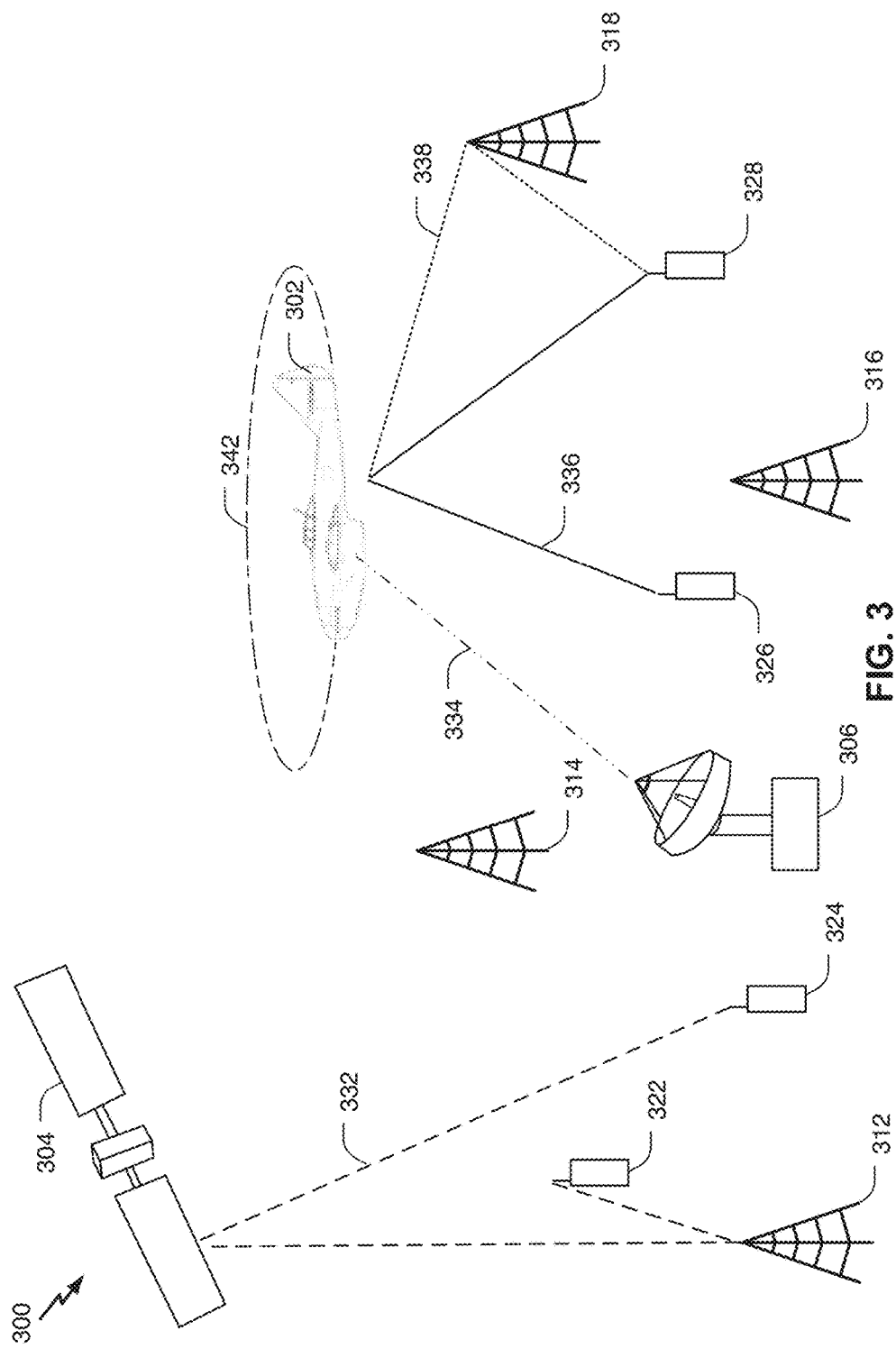
FIG. 3 is a diagram that illustrates an example of a wireless communication system.

FIG. 3 illustrates a diagram of an example of a wireless communication system 300 that includes a vehicle 302 operating as a HAP. The vehicle 302 may include or correspond to the vehicle 102 of FIG. 1, the vehicle of FIG. 2, or both. The wireless communication system 300 may include the vehicle 302, a satellite 304, a plurality of base stations 312-318, a plurality of user devices 322-328, and a gateway antenna 306.

The vehicle 302 may operate according to a flight path 342. The flight path 342 may include or correspond to a pattern. For example, the flight path 342 may include a loop, a circle, an ellipse, a figure eight, or a combination thereof. The flight path 342 may be indicated by flight path data which may be received from the gateway antenna 306 or stored in a memory of the vehicle 302. The satellite 304 may be configured to communicate with the vehicle 302, the plurality of base stations 312-318, the plurality of user device 322-328, and the gateway antenna 306, or a combination thereof.

The plurality of base stations 312-318 may be configured to communicate with the vehicle 302, the satellite 304, the plurality of user device 322-328, the gateway antenna 306, or a combination thereof. The plurality of base stations 312-318 may form or be included in a terrestrial cellular network of the wireless communication system 300. The plurality of base stations 312-318 may be configured to receive and transmit signals corresponding to communication links. The plurality of base stations 312-318 may be configured to receive signals from a user device and to transmit signals to another user device. Additionally, the plurality of base stations 312-318 may be configured to receive signals from a user device, another base station, the vehicle 302, or a combination thereof, and to transmit signals to another user device, another base station, the vehicle 302, or a combination thereof.

The plurality of user devices 322-328 includes a first user device 322, a second user device 324, a third user device 326, and a fourth user device 328. The plurality of user devices 322-328 may be configured to communicate with other user devices via one or more components of the wireless communication system 300.

In the particular example illustrate in FIG. 3, a first base station 312 may be associated with (e.g., support communication links for) the first user device 322. A second base station 314 may be associated with the second user device 324. A third base station 316 may be associated with the third user device 326. A fourth base station 318 may be associated with the fourth user device 328.

The gateway antenna 306 may be configured to communicate with a feeder link antenna of the vehicle 302, such as the feeder link antenna 110 of FIG. 1 or 208 of FIG. 2. The gateway antenna 306 may include gateway equipment, such as eNodeb equipment, core network equipment, a beam former (e.g., the beam former 142 of FIG. 1), or a combination thereof. The gateway equipment may be coupled to, and may communicate with, the Internet, a terrestrial cellular network (e.g., the plurality of base stations 312-318), satellites (e.g., the satellite 304), or a combination thereof.

During operation of the wireless communication system 300, the first user device 322 may establish the first communication link 332 with the second user device 324 via the satellite 304. The first user device 322 and the second user device 324 may be able to transmit and receive signals via the satellite 304 to enable wireless communications between the first user device 322 and the second user device 324.

The gateway antenna 306 may establish a second communication link 334 with the vehicle 302 to transmit or receive data. For example, the gateway antenna 306 may transmit the flight path data or the service coverage data to the feeder link antenna of the vehicle 302. The vehicle 302 may receive the flight path data from the gateway antenna 306 and may begin to operate according to the flight path 342 indicated by the flight path data. In some implementations, the vehicle 302 may transmit data, such as sensor data, to the gateway antenna 306 and the gateway antenna 306 may transmit beamforming weights to the vehicle 302 via the second communication link 334.

The vehicle 302 may be configured to support communication links for each device of the plurality of user device 322-328. For example, the vehicle 302 may support (or provide) a third communication link 336 to the third user device 326 and the fourth user device 328. The vehicle 302 may receive a first signal from the third user device 326 and may transmit a second signal to the fourth user device 328. The vehicle 302 may transmit and receive the signals using the plurality of phased array antennas. In a particular example, the vehicle 302 may receive the first signal via a first phased array antenna of the plurality of phased array antennas and may transmit the second signal via the first phased array antenna. In another particular example, the vehicle 302 may receive the first signal via the first phased array antenna of the plurality of phased array antennas and may transmit the second signal via a second phased array antenna of the plurality of phased array antennas. Additionally or alternatively, the vehicle 302 may receive signals corresponding to the third communication link 336 from the fourth user device 328 and may transmit signals corresponding to the third communication link 336 to the third user device 326.

As another example, the vehicle 302 may support a fourth communication link 338 to the third user device 326 and the fourth user device 328. The fourth user device 328 may transmit a third signal to the fourth base station 318. The fourth base station 318 may relay the third signal to the vehicle 302. For example, the fourth based station 318 may generate a fourth signal based on the third signal and may transmit the fourth signal to the vehicle 302. The vehicle 302 may receive the fourth signal via the plurality of phased array antennas and may send a fifth signal to the third user device 326. Additionally or alternatively, the vehicle 302 may receive signals corresponding to the fourth communication link 338 from the third user device 326 and may transmit signals corresponding to the fourth communication link 338 to the fourth user device 328 via the fourth base station 318.

The signals of the third communication link 336 and the signals of the fourth communication link 338 may be transmitted at a lower power or with a lower gain than the signals of the first communication link 332, as the signals of the first communication link 332 have to travel farther and pass through multiple layers (e.g., the ozone layer) of the Earth's atmosphere. Additionally, the vehicle 302 may be able to service a larger service area than a particular base station. For example, the vehicle 302 may transmit and receive signals from multiple user devices of the plurality of user device 322-328.

By operating a vehicle as a HAP, the wireless communication system may provide (or support) communication links that use less power than communication links that are provided via satellites. Additionally, vehicles operating as a HAP may offer better line of site than terrestrial equipment, such as base stations, and may provide better coverage or service a larger area for communication links than the terrestrial equipment. Furthermore, vehicles operating as a HAP may provide wireless communication service to remote areas (e.g., areas without ground based infrastructure), to areas with topography where ground based infrastructure is not commercially feasible, and/or to areas where infrastructure becomes damaged, such as due to weather.

Figure 4:
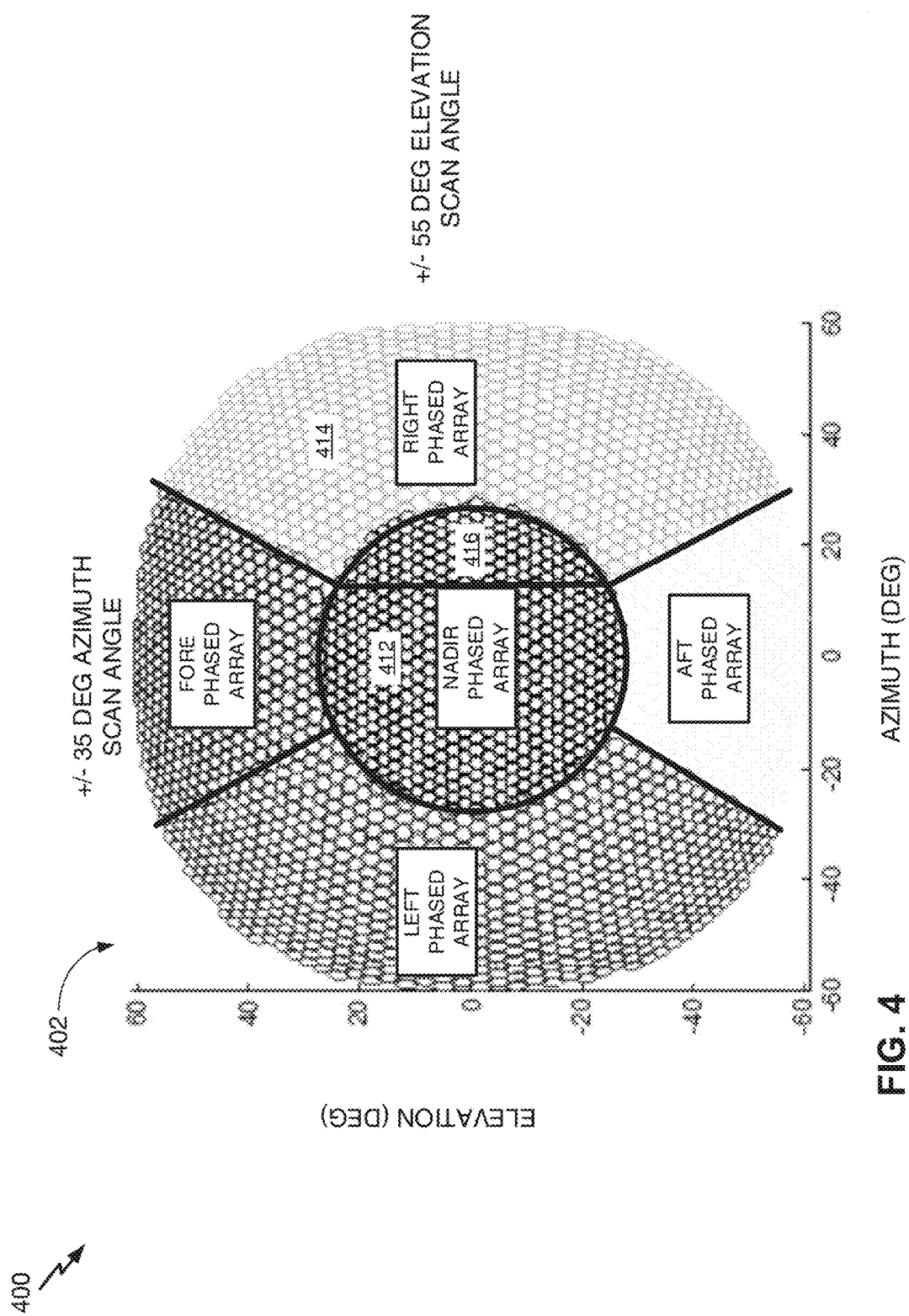
FIG. 4 is a diagram that illustrates an example of a ground coverage pattern of beams produced by a particular configuration of a plurality of phased array antennas.

FIG. 4 is a diagram that illustrates an example 400 of a beam map 402 produced by a particular configuration of a plurality of phased array antennas. The beam map 402 may correspond to beams produced by the plurality of antennas of FIGS. 1 and 2 included in a vehicle operating as a HAP. In a particular implementation, the vehicle is an aircraft operating between 17 km and 22 km above the Earth. For example, the vehicle may include or correspond to the vehicle 102 of FIG. 1, the vehicle of FIG. 2, the vehicle 302 of FIG. 3, or a combination thereof. The beam map 402 may be associated with a service coverage area and may produce a ground coverage pattern to provide communication links to the service coverage area.

In the example 400 illustrated in FIG. 4, the beam map 402 include five sections and has a service coverage area of 100 km in diameter. Each section includes multiple beams to service a plurality of cells and the multiple beams correspond to a particular phased array antenna. For example, multiple first beams 412 may be produced by a nadir phased array antenna and multiple second beams 414 may be produced by a right phased array antenna. In some implementations, each cell may have a similar size. For example, each cell in a particular section may have a similar size. To illustrate, each cell in a section corresponding to a starboard phased array antenna (e.g., a starboard antenna section) may have a dimension of 3.5 km by 7 km. In other implementations, each cell in a particular section or cells of different sections may have different sizes. For example, a cell in a port antenna section located near a nadir antenna section may be smaller than a cell in the port antenna section located near the outer edge of the port antenna section. As another example, a cell of the nadir antenna section may be smaller than cells of one or more other sections. To illustrate, cells of the nadir antenna section may be 1.7 km by 3.5 km and cells of the other sections may be 3.5 km by 7 km.

Additionally or alternatively, the plurality of cells may have similar shapes. For example, each cell in a particular section may have a similar shape. As another example each cell of multiple sections may have a similar shape. The shapes may include or correspond to hexagonal shapes, rhombic shapes, octagonal shapes, or a combination thereof, as illustrative, non-limiting examples.

Each phased array antenna of the plurality of phased array antennas may have an operating scan angle in azimuth and elevation coordinates. In the example 400 illustrated in FIG. 4, a fore phased array antenna, a nadir phased array antenna, and an aft phased array antenna each have an operating azimuth scan angle of plus or minus 35 degrees. The nadir phased array antenna may have a circular aspect to provide a substantially circular ground coverage pattern. A left phased array antenna and the right phased array antenna each have an operating elevation scan angle of plus or minus 55 degrees. In other implementations, the phased array antennas may have different operating scan angles. The operating scan angles may be based on maximum scan angles of the plurality of phased array antennas.

Each phased array antenna of the plurality of phased array antennas may have a maximum scan angle in a first plane and a second plane of a coordinate system (with the phased array antenna oriented in a third plane of the coordinate system). After the plurality of phased array antennas are attached to a vehicle, these maximum scan angles in the first plane and the second plane translate to a maximum azimuth scan angle and a maximum elevation scan angle. In the example 400 illustrated in FIG. 4, the fore phased array antenna, the nadir phased array antenna, and the aft phased array antenna each may have a maximum azimuth scan angle of greater than or equal to plus or minus 35 degrees. The left phased array antenna and the right phased array antenna may each have a maximum elevation scan angle of greater than or equal to plus or minus 55 degrees. In other implementations, the phased array antennas may have different maximum scan angles.

The plurality of antennas may be arranged such that a first potential ground coverage area associated with a first phased array antenna partially overlaps with a second potential ground coverage area associated with a second phased array antenna. To illustrate, the nadir array phased antenna may service a first portion of the service coverage area (using the multiple first beams 412) and the right phased array antenna may service a second portion of the service coverage area (using the multiple second beams 414). The right phased array antenna may be capable of supporting communication links for a portion 416 of the first portion of the service coverage area that is serviced by the multiple first beams 412 of the nadir phased array antenna. By having overlapping coverage areas (e.g., the portion 416), beam hand-off operations may be performed before reaching the maximum scan angle.

Each cell of the plurality of cells may have an associated frequency (or frequency range). The plurality of cells may reuse a frequency (or a frequency ranges). For example, a frequency (or frequency range) associated with a particular cell of a particular section may be different from other cells of the particular section. In a particular implementation, the particular cell may have a different frequency (or frequency range) than frequencies (or frequencies ranges) of surrounding cells to enable frequency reuse, as described with reference to FIG. 5.

Figure 5:
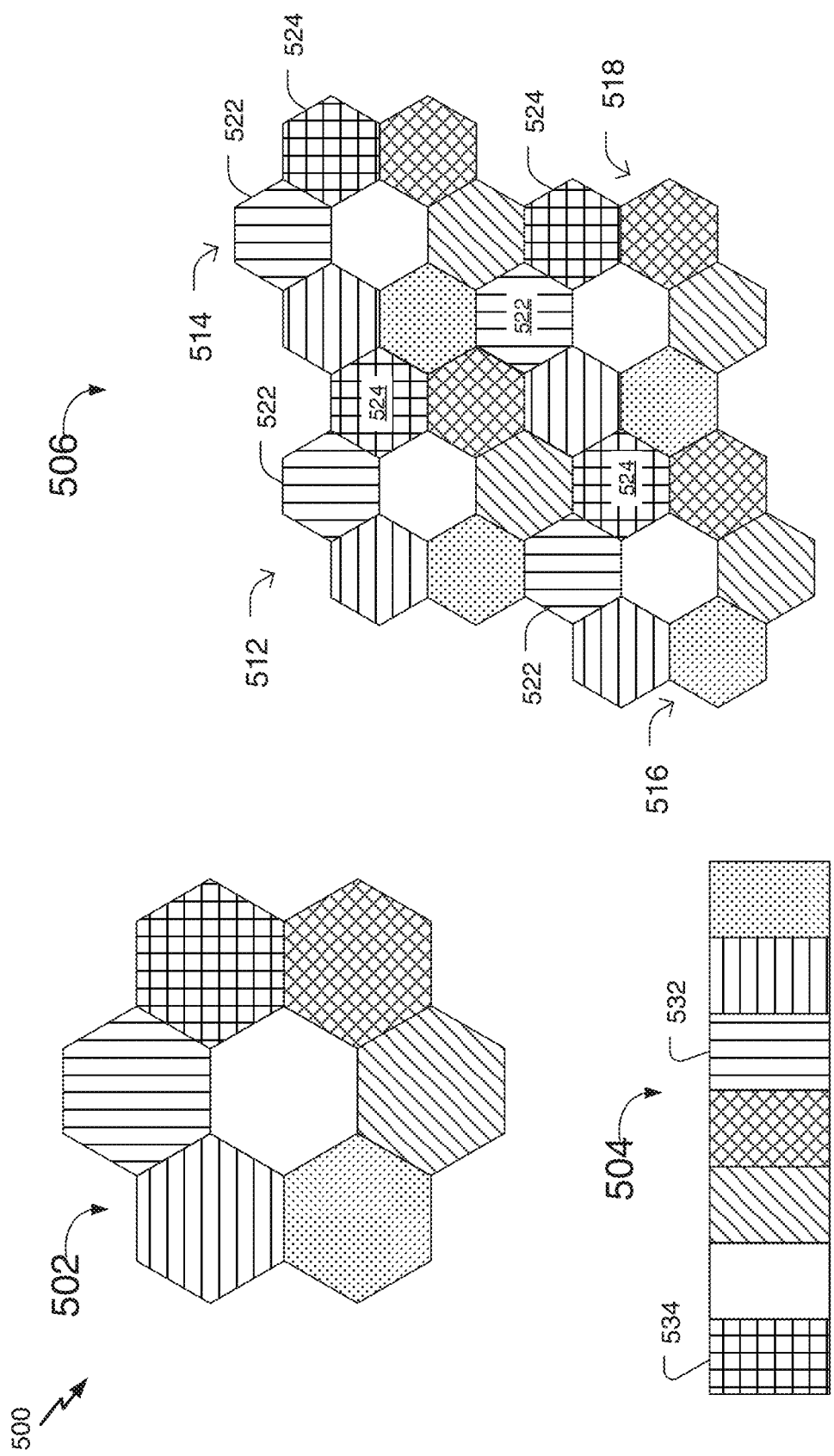
FIG. 5 is a diagram that illustrates an example of frequency reuse for a phased array antenna.

FIG. 5 illustrates an example 500 of frequency reuse for cells serviced by a phased array antenna. The phased array antenna may include or correspond to a phased array antenna of the plurality of phased array antenna 106 of FIG. 1, the phased array antennas 210-220 of FIG. 2, the phased array antennas of FIG. 4, or a combination thereof.

Frequency reuse occurs when a range of frequencies (e.g., a frequency band) allocated to a wireless communication system or a HAP are re-used in a cells of a service coverage area in patterns. The frequency band may include a plurality of channels. A channel (e.g., a subset of frequencies of the range of frequencies) may be assigned dynamically to each of the beams according to a frequency reuse pattern, such as 3 color, 4 color, 7 color, 20 color, etc.

In the example 500 illustrated in FIG. 5, a diagram 502 illustrates a 7 color frequency reuse pattern for 7 cells, such as a cluster pattern. Although the cells are illustrated as hexagonal, other shapes may be used, as described with reference to FIG. 4. Additionally, each cell may have a different size or shape depending on a topography of a location associated with the cell or other service characteristics, such as population density. A diagram 504 illustrates a frequency band divided into 7 equal segments or channels. To illustrate, for a 700 megahertz (MHz) frequency band, a first channel may correspond to a first 100 MHz of frequencies of the frequency band, a second channel may correspond to a second 100 MHz of frequencies of the frequency band, etc. Although each channel is illustrated in FIG. 5 as having the same width or bandwidth, in other implementations the channels may have varying widths or bandwidths. A diagram 506 illustrates the frequency reuse pattern of the diagram 502 replicated for a plurality of cells (e.g., a portion of a service coverage area). The diagram 506 depicts four clusters 512-518 each having the 7 color frequency reuse pattern of the diagram 502. In the diagram 506, multiple first cells may be serviced by a first set of beams 522 having a first frequency 532 (or a first range of frequencies), and multiple second cells may be serviced by a second set of beams 524 having a second frequency 534 (or a second range of frequencies). The first set of beams 522 and the second set of beams 524 may be generated by the same phased array antenna or different phased array antennas.

By assigning channels to the beams according to a frequency reuse pattern, interference between communication links can be reduced as compared to systems which do not use a frequency reuse pattern. Additionally, a reuse distance between channels is increased resulting in generating sidelobe suppression (reducing signal leakage) that is sufficient enough to keep co-channel interference below a threshold level (e.g., a level acceptable to or unnoticeable by users)

Figure 6:
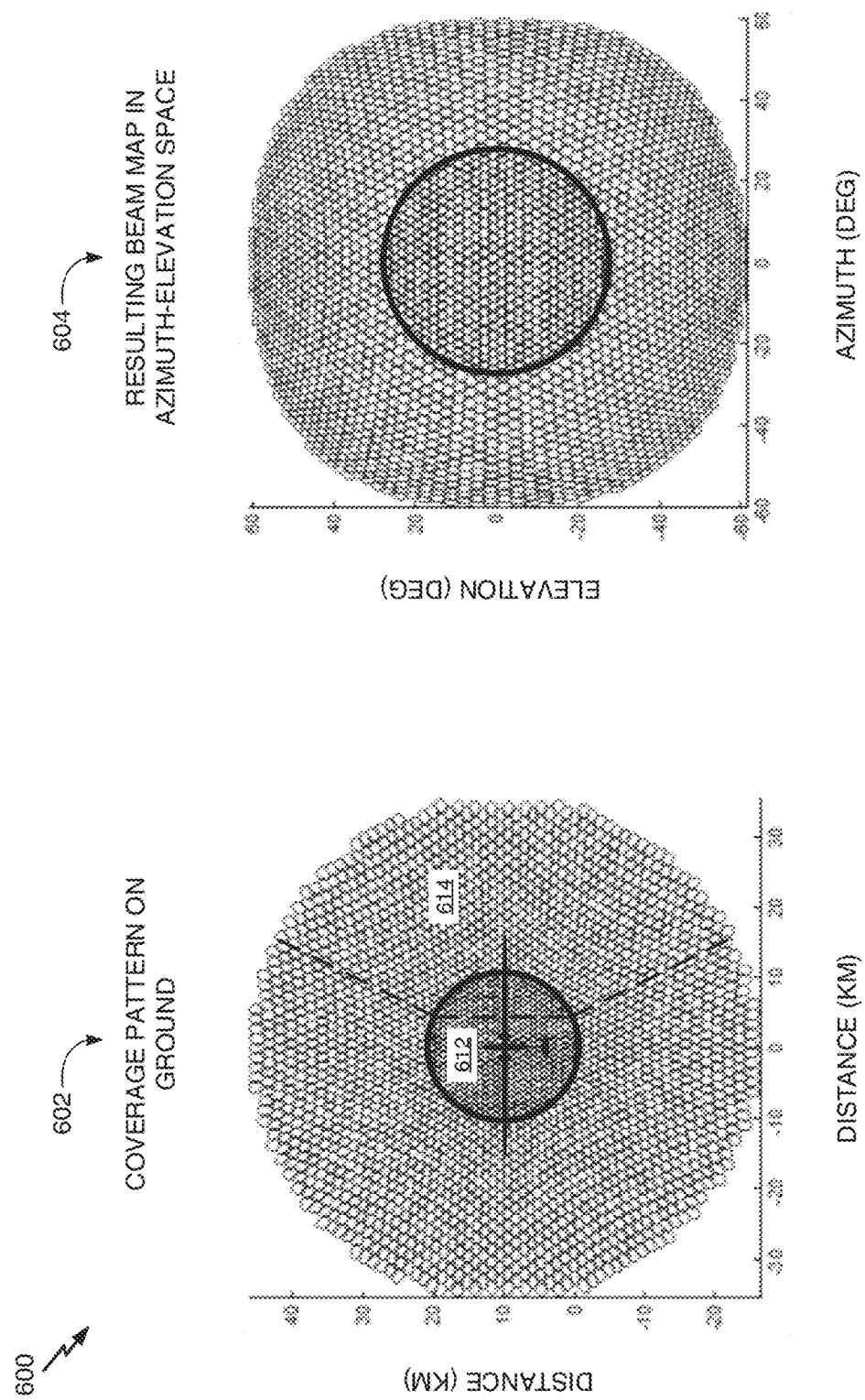
FIG. 6 is a diagram that illustrates an example of beam coverage and beam shape for a plurality of phased array antennas.

FIG. 6 a diagram that illustrates an example 600 of beam coverage and beam shape for a plurality of beams generated by a plurality of phased array antennas of a vehicle. For example, the vehicle may include or correspond to the vehicle 102 of FIG. 1, the vehicle of FIG. 2, the vehicle 302 of FIG. 3, or a combination thereof. The phased array antenna may include or correspond to a phased array antenna of the plurality of phased array antenna 106 of FIG. 1, the phased array antennas 210-220 of FIG. 2, the phased array antennas of FIG. 4, or a combination thereof.

In the example 600 illustrated in FIG. 6, a coverage pattern diagram 602 illustrates ground coverage (e.g., a service coverage area) for a plurality of phased array antennas of a vehicle operating as a HAP. A beam map diagram 604 illustrates that corresponding beam shapes used to generate the ground coverage of the coverage pattern diagram 602. As illustrated in FIG. 6, cell sizes of the coverage pattern diagram 602 may be substantially uniform. For example, cell sizes within the black ring are substantially the same size as each other and cell sizes outside of the black ring are substantially the same size as each other. To illustrate, beams located near the outside of the beam map diagram 604 are smaller than beams located near the center of the beam map diagram 604 such that when the beams are projected on the ground, the cell sizes may be substantially uniform.

During operation, the vehicle may operate according to a flight path such that the vehicle may be operating substantially near a center of the service coverage area at all times during the flight path. In some implementations, the vehicle may operate according to a circular flight path with a diameter of 1 to 2 km at a location or within an area. The flight path may also indicate an altitude of the vehicle. To illustrate, the vehicle may travel along the circular flight path at an altitude of 22 km, and the center of the flight path may be located at or near the center of the service coverage area. Additionally, the flight path may indicate a range or a tolerance for the diameter, the location, the altitude, or a combination thereof, of the flight path. In other implementations, the vehicle may operate according to an elliptical flight path or a lemniscate (e.g., a figure eight) flight path. For example, flight restrictions or air space restrictions may restrict the vehicle from operating over a portion of the service coverage area. The vehicle may be part of a wireless communications system and may support communication links for the service coverage area, as described with reference to FIG. 3.

As an illustrative, non-limiting example, a first phased array antenna of the vehicle may be able to provide service to a first portion 612 (defined by the circle) of the service coverage area and a second phased array antenna may be able to provide service to a second portion 614 (defined by dashed lines) of the service coverage area. The first portion 612 of the service coverage area may partially overlap the second portion 614 to enable more time for beam handoff operations.

Figure 7:
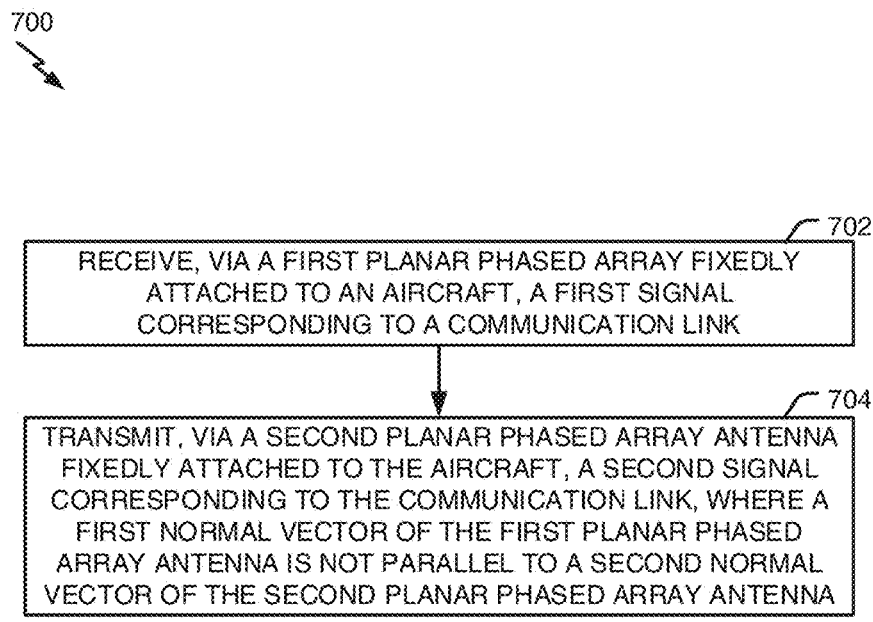
FIG. 7 is a flow chart of an example of a method of communicating via a plurality of phased array antennas.

FIG. 7 illustrates a particular example of a method 700 of method of communicating via a plurality of phased array antennas on board a vehicle. The method 700 may be performed by the system 100 of FIG. 1, the vehicle 102 of FIG. 1, the vehicle 302 of FIG. 3, or a combination thereof. The method 700 may include or correspond to a method for communicating via a phased array antenna system.

The method 700 includes, at 702, receiving, via a first planar phased array antenna fixedly attached to an aircraft, a first signal corresponding to a communication link. For example, the first planar phased array antenna may include or correspond to the first phased array antenna of 132 of FIG. 1, the second phased array antenna of 134 of FIG. 1, or a phased array antenna of the phased array antennas 210-220 of FIG. 2. The aircraft may include or correspond to the vehicle 102 of FIG. 1. To illustrate, referring to FIG. 3, the vehicle 302 may receive a first signal from the third user device 326 that correspond to the third communication link 336 between the third user device 326 and the fourth user device 328. In some implementations, the data includes sensor data from a plurality of sensors onboard the vehicle, such as the plurality of sensors 114 of FIG. 1.

The method 700 includes, at 704, transmitting, via a second planar phased array antenna fixedly attached to the aircraft, a second signal corresponding to the communication link. A first normal vector of the first planar phased array antenna may not be parallel to a second normal vector of the second planar phased array antenna. For example, the second planar phased array antenna may include or correspond to the first phased array antenna of 132 of FIG. 1, the second phased array antenna of 134 of FIG. 1, or a phased array antenna of the phased array antennas 210-220 of FIG. 2. To illustrate, referring to FIG. 3, the vehicle 302 may transmit a second signal to the fourth user device 328 that correspond to the third communication link 336.

In some implementations, the first signal corresponding to the communication link may be received from a first user device or a first ground station. The second signal corresponding to the communication link may be transmitted to a second user device or a second ground station. For example, the first signal and the second signal may include or correspond to the signals of the third communication link 336 of FIG. 3, the fourth communication link 338 of FIG. 3, or both. Each of the first ground station and the second ground station may include or correspond to a base station of the plurality of base stations 312-318 of FIG. 3.

The method 700 may enable a vehicle operating as a HAP to transmit and receive signals corresponding to communication links of a wireless communication system. The method 700 may consume less power and may operate on frequencies compatible by cellular device as compared to satellites and other HAP vehicles that operate above the Ozone layer. The method 700 may more quickly and efficiently provide increased bandwidth to areas expecting an influx in population density (e.g., a concert or an event) and as compared to building ground based infrastructure. The method 700 may provide wireless communication service to remote areas (e.g., areas without ground based infrastructure), to areas with topography where ground based infrastructure is not commercially feasible, and/or to areas where infrastructure becomes damaged, such as due to weather.

Figure 8:
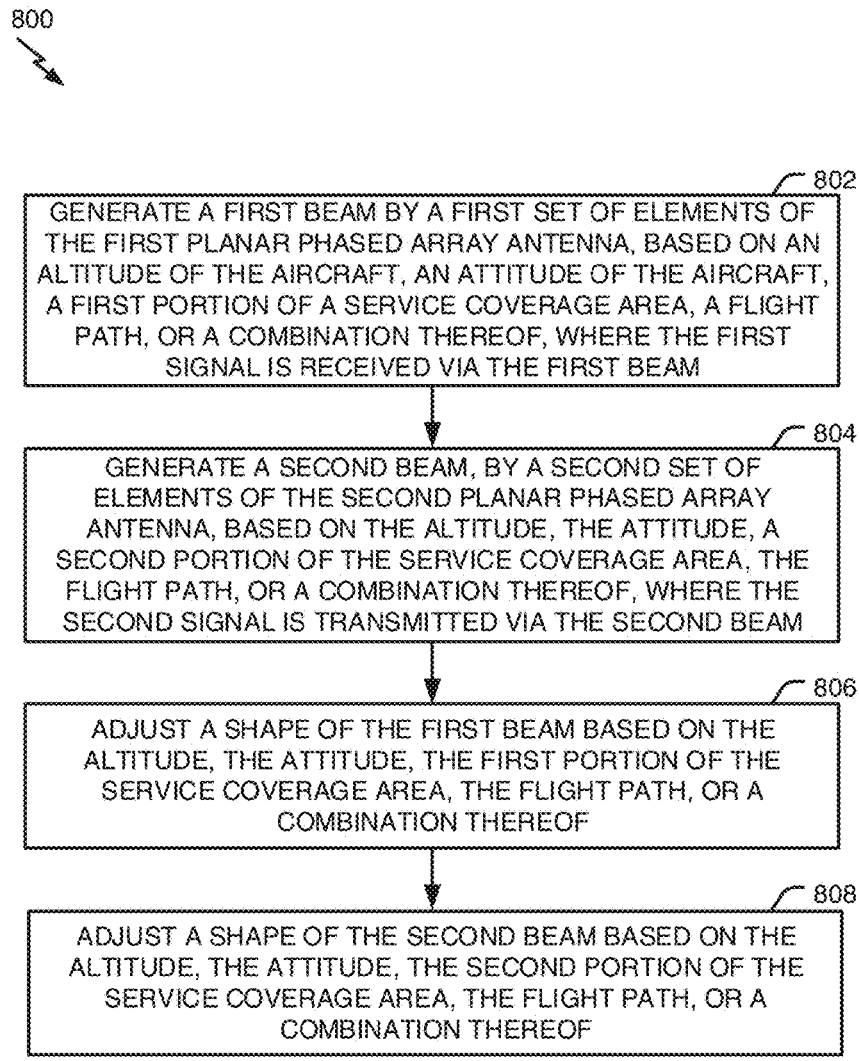
FIG. 8 is a flow chart of another example of a method of communicating via a plurality of phased array antennas.
Figure 9:
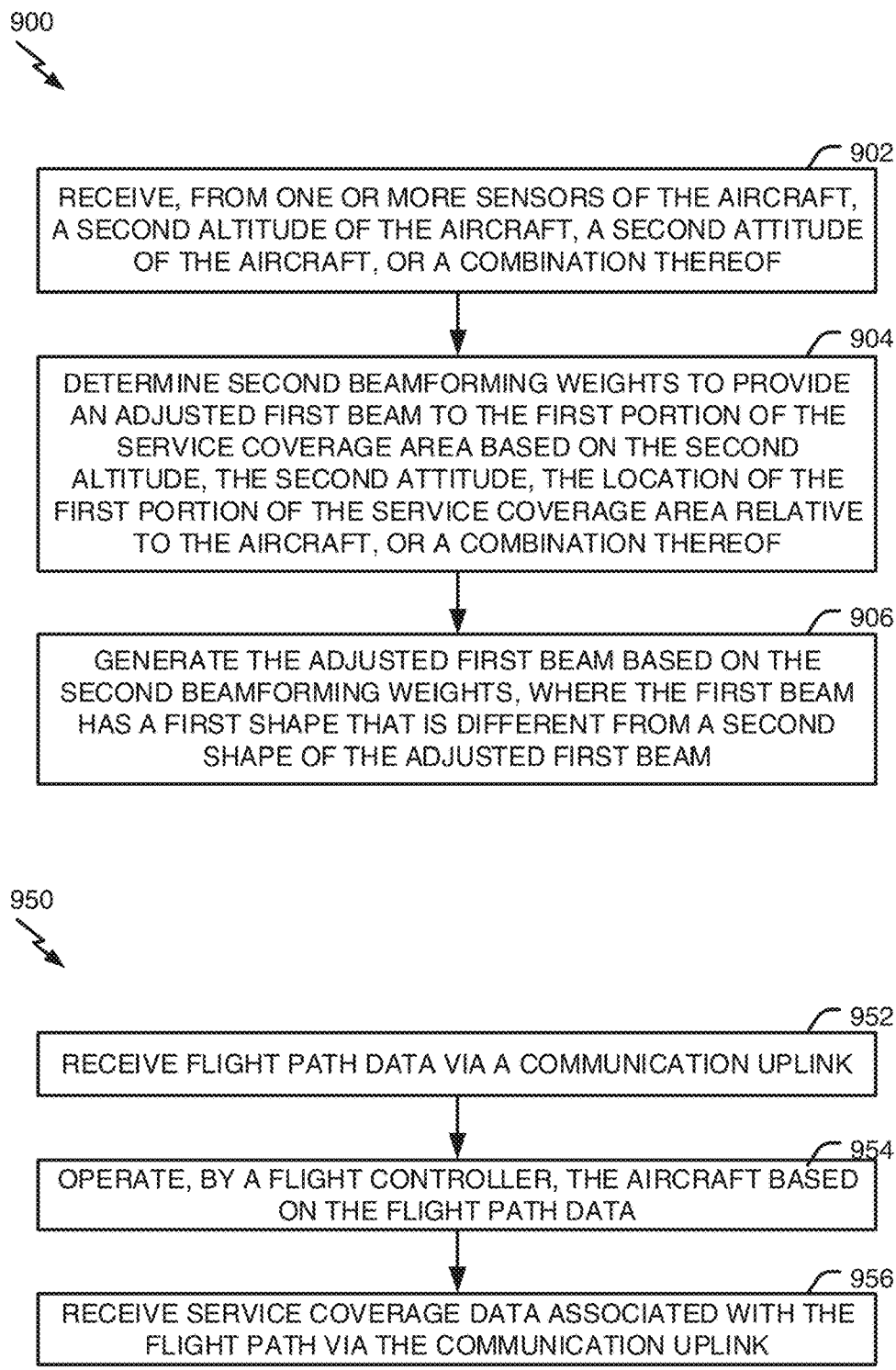
FIG. 9 is a flow chart of example methods of communicating via a plurality of phased array antennas.
Figure 10:
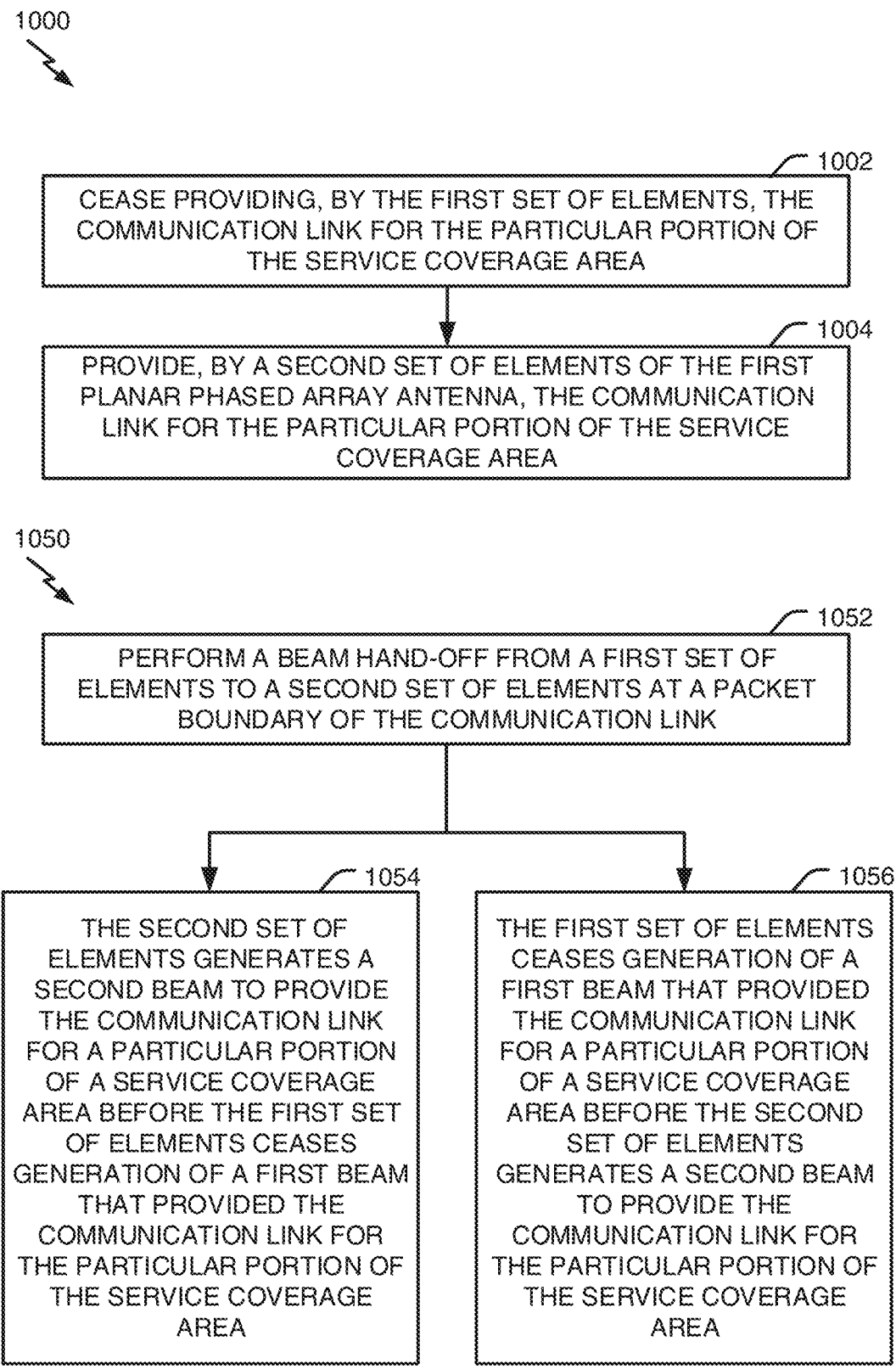
FIG. 10 is a flow chart of example methods of communicating via a plurality of phased array antennas.

FIGS. 8-10 illustrate one or more additional operations that may be performed in addition to the operations of the method 700 of FIG. 7. Operations of methods 800, 900, 950, 1000, and 1050 may be performed by the system 100 of FIG. 1, the vehicle 102 of FIG. 1, the vehicle 302 of FIG. 3, or a combination thereof. Referring to FIG. 8, the method 800 may include or correspond to an exemplary method for generating and adjusting beams when communicating via a phased array antenna system.

The method 800 may include one or more of the operations 802-808. As illustrated in FIG. 8, the method 800 includes, at 802, generating a first beam, by a first set of elements of the first planar phased array antenna, based on an altitude of the aircraft, an attitude of the aircraft, a first portion of a service coverage area, a flight path, or a combination thereof. The first signal may be received via the first beam. The method 800 includes, at 804, generating a second beam, by a second set of elements of the second planar phased array antenna, based on the altitude, the attitude, a second portion of the service coverage area, the flight path, or a combination thereof. The second signal may be transmitted via the second beam. To illustrate, the first set of elements of the first phased array antenna 132 may generate the first beam and the set of elements of the second phased array antenna 134 may generate the second beam based on the sensor data, the flight path data, and the service coverage data, as described with reference to FIG. 1.

The method 800 includes, at 806, adjusting a shape of the first beam based on the altitude, the attitude, the first portion of the service coverage area, the flight path, or a combination thereof. The method 800 includes, at 808, adjusting a shape of the second beam based on the altitude, the attitude, the second portion of the service coverage area, the flight path, or a combination thereof. For example, the beam former 142 may adjust a phase, an amplitude, or both, of signals generated the first set of elements and the second set of elements to adjust the shape of the first beam and the second beam, as described with reference to FIG. 1.

FIG. 9 illustrates the method 900 and the method 950. The method 900 may include or correspond to another exemplary method for adjusting beams when communicating via a phased array antenna system. The method 950 may include or correspond to an exemplary method for receiving (or updating) flight path data and/or service coverage data when communicating via a phased array antenna system.

The method 900 may include one or more of the operations 902-906 and may correspond to a particular example of adjusting the shape of the first beam as described with reference to the operation 806 of FIG. 8. In the method 900 illustrated in FIG. 9, the first beam is generated based on first beamforming weights and provides the communication link to the first portion of the service coverage area. In a particular implementation, the first beamforming weights are determined based on a first altitude of the aircraft, a first attitude of the aircraft, a location of the first portion of the service coverage area relative to the aircraft, or a combination thereof.

The method 900 includes, at 902, receiving, from one or more sensors of the aircraft, a second altitude of the aircraft, a second attitude of the aircraft, or a combination thereof. The method 900 also includes, at 904, determining second beamforming weights to provide the first beam to the first portion of the service coverage area based on the second altitude, the second attitude, the location of the first portion of the service coverage area relative to the aircraft, or a combination thereof. The method 900 further includes, at 906, generating an adjusted first beam based on the second beamforming weights. The first beam may have a first shape that is different from a second shape of the adjusted first beam.

Referring to the method 950, the method 950 includes, at 952, receiving flight path data via a communication uplink. For example, the vehicle 302 may receive the flight path data, the service coverage data, or a both from the gateway antenna 306 via the feeder link antenna. The method 950 includes, at 954, operating the aircraft based on the flight path data. For example, the vehicle 302 may be operated according to the flight path 342 based on the flight path data. The method 950 includes, at 956, receiving service coverage data associated with the flight path via the communication uplink, such as the feeder link antenna 110 of FIG. 1 or the feeder link antenna 208 of FIG. 2.

FIG. 10 illustrates the method 1000 and the method 1050. The method 1000 may include or correspond to an exemplary method for performing a hand-off (e.g., an intra-antenna hand-off) when communicating via a phased array antenna system. The method 1050 may include or correspond to another exemplary method for performing a hand-off (e.g., an inter-antenna hand-off) when communicating via a phased array antenna system.

The method 1000 may include one or more of the operations 1002-1006 and may correspond to a soft hand-off (e.g., a make-before-break hand-off) or a hard hand-off (e.g., a make-before-break hand-off). In the method 1000 illustrated in FIG. 10, a first set of elements of the first planar phased array antenna provides the communication link for a particular portion of a service coverage area. In such implementations, the method 1000 includes executing a beam hand-off for the first planar phased array antenna that includes, at 1002, ceasing providing, by the first set of elements, the communication link for the particular portion of the service coverage area. The method 1000 further includes, at 1004, providing, by a second set of elements of the first planar phased array antenna, the communication link for the particular portion of the service coverage area. Providing the communication link may include receiving and transmitting signals corresponding to the communication link. In some implementations, the second set of elements may provide the communication link for the particular portion of the service before the first set of elements ceases providing the communication link for the particular portion. To illustrate, the second set of elements of the first phased array antenna 132 of FIG. 1 may generate the second signal before the first set of elements of the first phased array antenna 132 ceases generating the first signal or adjusts the first signal to cover another portion of the service coverage area, as described with reference to FIG. 1.

In other implementations, executing the beam hand-off includes ceasing providing, by the first set of elements, the communication link for the particular portion of the service coverage area. For example, the first set of elements may cease providing the communication link for the particular portion of the service coverage area, or may begin to provide service to another portion of the coverage area. Executing the beam hand-off may further include providing, by a first set of elements of the second planar phased array antenna, the communication link for the particular portion of the service coverage area. In some implementations, the second set of elements may provide the communication link for the particular portion of the service before the first set of elements ceases providing the communication link for the particular portion. To illustrate, the set of elements of the second phased array antenna 134 of FIG. 1 may provide the communication link for the particular portion of the service before the first set of elements of the first phased array antenna 132 of FIG. 1 ceases providing the communication link for the particular portion, as described with reference to FIG. 1. In some implementations, the soft hand-off, the hard hand-off, or both, of the first phased array antenna may occur at a packet boundary.

Referring to the method 1050, the method 1050 includes, at 1052, performing a beam hand-off from a first set of elements to a second set of elements at a packet boundary of the communication link. For example, the communication controller 108 of FIG. 1 may perform the beam hand-off (e.g., an inter-antenna hand-off) at or near an end of a first packet and a beginning of a second packet of the communication link. In a particular implementation, the communication controller 108 may send a control signal to one or more phased arrays of the plurality of phased array antennas to initiate the beam hand-off. For example, the control signal may be sent to the first planar phased array antenna and to the second planar phased and may indicate a hand-off from the first planar phased array antenna to the second planar phased array antenna to maintain a particular communication link based on an expected flight path and expected attitude of the aircraft.

The method 1050 includes performing a soft hand-off, at 1054, or performing a hard hand-off, at 1056. For example, the method 1050 includes, at 1054, the second set of elements generates a second beam to provide the communication link for a particular portion of a service coverage area before the first set of elements ceases generation of a first beam that provided the communication link for the particular portion of the service coverage area. Alternatively, the method 1050 includes, at 1056, the first set of elements ceases generation of a first beam that provided the communication link for a particular portion of a service coverage area before the second set of elements generates a second beam to provide the communication link for the particular portion of the service coverage area. In some implementations, the communication controller 108 may be configured to perform both soft hand-offs and hard hand-offs. In other implementations, performing a hand-off may occur over a plurality of packets. For example, when performing a soft hand-off (e.g., a make-before-break hand-off) both the first planar phased array antenna and the second planar phased array antenna may maintain the communication link while a plurality of packets are transmitted and/or received.

Figure 11:
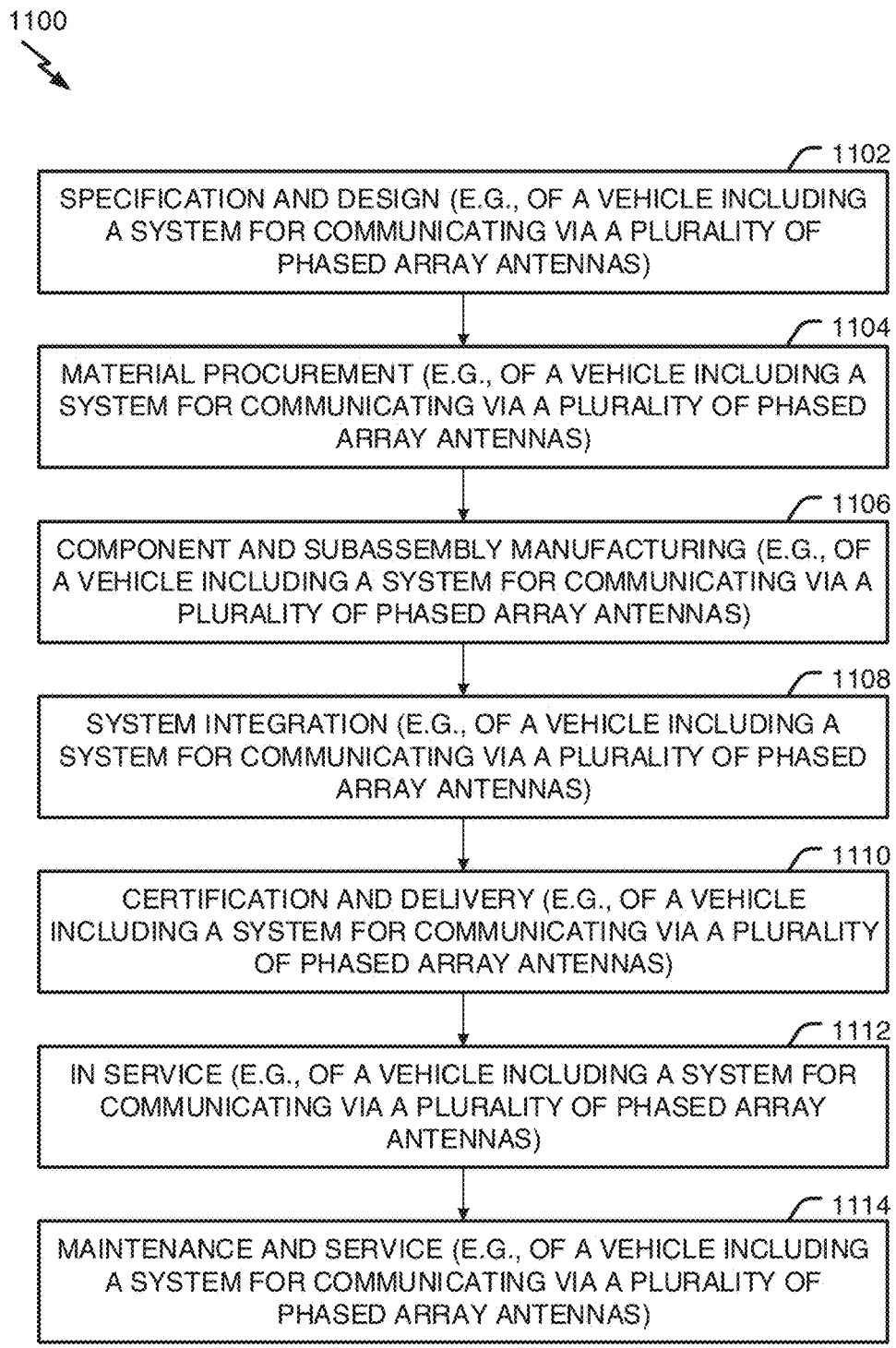
FIG. 11 is a flow chart of an example of a method of operating a system for communicating via a plurality of phased array antennas.
Figure 12:
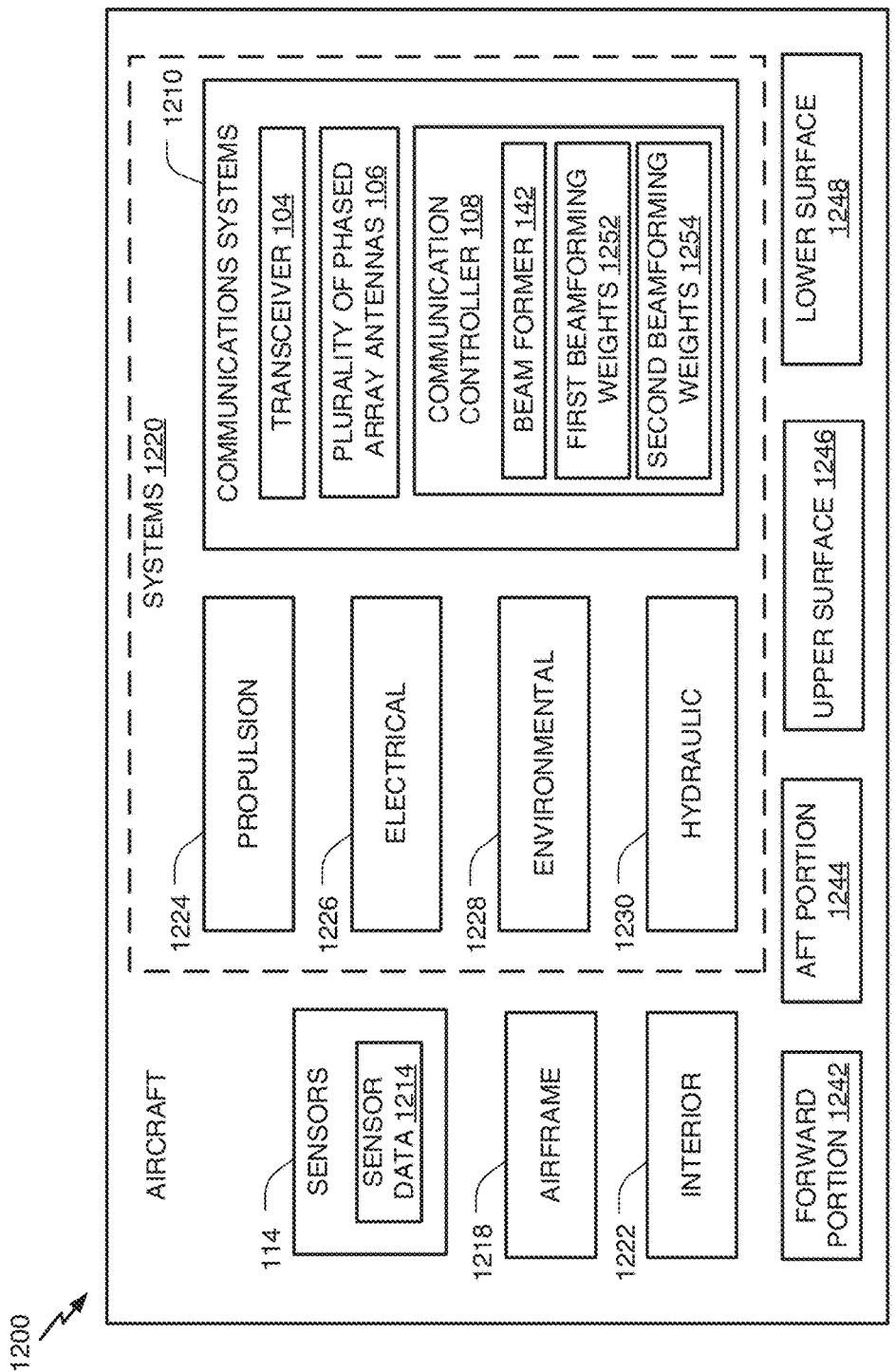
FIG. 12 is a block diagram of an illustrative implementation of a vehicle that includes a system for communicating via a plurality of phased array antennas.

Referring to FIGS. 11 and 12, examples of the disclosure are described in the context of a vehicle manufacturing and service method 1100 as illustrated by the flow chart of FIG. 11 and a vehicle system 1200 as illustrated by the block diagram of FIG. 12. A vehicle produced by the vehicle manufacturing and service method 1100 of FIG. 11 and a vehicle 1202 of FIG. 12 may include an aircraft, an airship, or another vehicle, as illustrative, non-limiting examples. The vehicle 1202 may be manned or unmanned (e.g., a drone or an unmanned aerial vehicle (UAV). The vehicle 1202 may operate as a HAP.

Referring to FIG. 11, a flowchart of an illustrative example of a method of operating a system for communicating via a plurality of phased array antennas (e.g., a communications system) is shown and designated 1100. During pre-production, the exemplary method 1100 includes, at 102, specification and design of a vehicle, such as the vehicle 102 of FIG. 1 or a vehicle 1202 described with reference to FIG. 12. During the specification and design of the vehicle, the method 1100 may include specifying a transceiver, a plurality of phased array antennas, a communication controller, or a combination thereof. The transceiver and the plurality of phased array antennas may include or correspond to the transceiver 104 and the plurality of phased array antennas 106, respectively. The communication controller may include or correspond to the communication controller 108. At 1104, the method 1100 includes material procurement. For example, the method 1100 may include procuring materials (such as the transceiver 104 of FIG. 1, the plurality of phased array antennas 106 of FIG. 1, the communication controller 108 of FIG. 1, or a combination thereof) for the communications system.

During production, the method 1100 includes, at 1106, component and subassembly manufacturing and, at 808, system integration of the vehicle. The method 800 may include component and subassembly manufacturing (e.g., producing the transceiver 104 of FIG. 1, the plurality of phased array antennas 106 of FIG. 1, the communication controller 108 of FIG. 1, or a combination thereof) of the communications system and system integration (e.g., coupling the communication controller 108 to the plurality of phased array antennas 106) of the system for communicating via a plurality of phased array antennas. At 1110, the method 1100 includes certification and delivery of the vehicle and, at 1112, placing the vehicle in service. Certification and delivery may include certifying the communications system. The method 1100 may include placing the communications system in service. While in service by a customer, the vehicle may be scheduled for routine maintenance and service (which may also include modification, reconfiguration, refurbishment, and so on). At 1114, the method 1100 includes performing maintenance and service on the vehicle. The method 1100 may include performing maintenance and service of the communications system. For example, maintenance and service of the communications system may include replacing one or more of the transceiver 104 of FIG. 1, the plurality of phased array antennas 106 of FIG. 1, the communication controller 108 of FIG. 1, or a combination thereof.

Each of the processes of the method 800 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be an airline, leasing company, military entity, service organization, and so on.

Referring to FIG. 12, a block diagram of an illustrative implementation of a vehicle that includes components of a system for communicating via a plurality of phased array antennas is shown and designated 1200. For example, the vehicle 1202 may include or correspond to the vehicle 102 of FIG. 1. To illustrate, the vehicle 1202 may include an aircraft, as an illustrative, non-limiting example. The vehicle may have been produced by at least a portion of the method 1100 of FIG. 11. As shown in FIG. 1, the vehicle 1202 (e.g., an aircraft) may include a plurality of sensors 114, an airframe 1218, an interior 1222, a forward portion 1242, an aft portion 1244, an upper surface 1246, a lower surface 1248, and a plurality of systems 1220 including a communications system 1201. The plurality of systems 1220 may additionally include one or more of a propulsion system 1224, an electrical system 1226, an environmental system 1228, or a hydraulic system 1230. The communications system 1201 may include components of the system 100 described with reference to FIG. 1, and may include the transceiver 104, the plurality of phased array antennas 106, and a communication controller 108. In some implementations, the communication controller 108 of the vehicle 1202 may include a beam former 142. The beam former 142 determines beamforming weights 1252, as described with reference to FIG. 1 The beam former 142 may determine the second beamforming weights 1254 by adjusting the first beamforming weights 1252 as described with reference to FIG. 1.

Additionally, any number of other systems may be included, such as a memory (not shown) coupled to transceiver 104, the communication controller 108, or both. The memory may include or correspond to the memory 116 of FIG. 1. The transceiver 104, the communication controller 108, or both, may be configured to execute computer-executable instructions (e.g., a program of one or more instructions) stored in the memory. The instructions, when executed, cause the transceiver 104, the communication controller 108, or both, to perform one or more operations of the method 700 of FIG. 7, the method 800 of FIG. 8, the methods 900 and 950 of FIG. 9, the method 1000 of FIG. 10, or a combination thereof.

Apparatus and methods included herein may be employed during any one or more of the stages of the method 1100 of FIG. 11. For example, components or subassemblies corresponding to production process 1108 may be fabricated or manufactured in a manner similar to components or subassemblies produced while the vehicle 1202 is in service, at 1112 for example and without limitation. Also, one or more apparatus implementations, method implementations, or a combination thereof may be utilized during the production stages (e.g., stages 1102-1110 of the method 1100), for example, by substantially expediting assembly of or reducing the cost of the vehicle 1202. Similarly, one or more of apparatus implementations, method implementations, or a combination thereof, may be utilized while the vehicle 1202 is in service, at 1112 for example and without limitation, to maintenance and service, at 1114.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

The invention claimed is:

1. An aircraft comprising:
a fuselage (230);
wings (232, 234) coupled to the fuselage;
a plurality of planar phased array antennas (106, 132, 134, 210-218, 260) coupled to a transceiver (104) and fixedly attached to the fuselage or at least one of the wings, the plurality of planar phased array antennas including a first planar phased array antenna (132, 210-218) having a first normal vector (220-228, 262, 264) and a second planar phased array antenna (134, 210-218) having a second normal vector (220-228, 262, 264), wherein the first normal vector is not parallel to the second normal vector, wherein the first planar phased array antenna (132) is configured to receive (702) a first signal corresponding to a communication link (336), and wherein the second planar phased array antenna (134) is configured to transmit (704) a second signal corresponding to the communication link; and
the transceiver, the transceiver configured to couple to a feeder link antenna (110), the feeder link antenna configured to receive (952) flight path data associated with a flight path via a communication uplink, wherein a flight controller (112) is configured to operate the aircraft based on the flight path data.

2. The aircraft of claim 1, wherein the plurality of planar phased array antennas are fixedly attached to at least one of a fuselage lower portion (124, 248) and an under wing portion (250), wherein two or more of the plurality of planar phased array antennas have mutually non-parallel normal vectors, and wherein the first planar phased array antenna has a first aspect ratio (272) that is different from a second aspect ratio (274) of the second planar phased array antenna.

3. The aircraft of claim 1, wherein the plurality of planar phased array antennas further includes:
a third planar phased array antenna (210) fixedly attached to a first portion (240) of the fuselage;
a fourth planar phased array antenna (212) fixedly attached to a second portion (242) of the fuselage; and
a fifth planar phased array antenna (214) fixedly attached to a third portion (244) of the fuselage of the aircraft, wherein the first planar phased array antenna is fixedly attached to a starboard wing (232) of the wings and the second planar phased array antenna is fixedly attached to a port wing (234) of the wings.

4. The aircraft of claim 3, wherein the fuselage, the wings, the transceiver, and the plurality of planar phased array antennas comprise an unmanned aerial vehicle, wherein the first normal vector is orientated in a starboard direction (252) relative to the unmanned aerial vehicle, and wherein the second normal vector is orientated in a port direction (254) relative to the unmanned aerial vehicle.

5. The aircraft of claim 1, wherein the first planar phased array antenna has a first maximum scan angle (256) that is different than a second maximum scan angle (258) of the second planar phased array antenna, and wherein a first potential ground coverage area (612) associated with the first planar phased array antenna partially overlaps with a second potential ground coverage area (614) associated with the second planar phased array antenna.

6. The aircraft of claim 5, wherein the first planar phased array antenna is configured to generate multiple first beams (412) and the second planar phased array antenna is configured to generate multiple second beams (414), and wherein the multiple first beams do not overlap the multiple second beams.

7. The aircraft of claim 1, further comprising:
a plurality of sensors (114) configured to generate sensor data (1214), wherein the sensor data indicates an altitude, an attitude, a position, or a combination thereof; and
a communication controller (108) coupled to the transceiver and configured to determine and adjust beamforming weights (1252) based on the altitude, the attitude, and a location of a service coverage area relative to the position.

8. The aircraft of claim 7, wherein the communication controller is further configured to cause a particular planar phased array antenna of the plurality of planar phased array antennas to generate a first set of beams (522) having a first frequency (532) and a second set of beams (524) having a second frequency (534).

9. The aircraft of claim 8, wherein each beam of the first set of beams supports transmission and reception of signals corresponding to a communication link (332-338), and wherein the first set of beams are interspersed among the second set of beams to enable frequency reuse of the first frequency.

10. The aircraft of claim 7, wherein the communication controller is further configured to provide a control signal to the transceiver, and wherein the control signal indicates a hand-off from the first planar phased array antenna to the second planar phased array antenna.

11. The aircraft of claim 10, wherein the control signal is generated based on an expected flight path, and wherein the hand-off from the first planar phased array antenna to the second planar phased array antenna comprises a make-before-break hand-off.

12. The aircraft of claim 10, wherein the control signal is generated based on an expected flight path, and wherein the hand-off from the first planar phased array antenna to the second planar phased array antenna comprises a break-before-make hand-off using packet boundaries.

13. The aircraft of claim 7, wherein the communication controller is further configured to cause an active channel of the first planar phased array antenna to transmit a message to a user device associated with the active channel indicating an upcoming loss of connection in response to determining that no alternative active channel is available on the second planar phased array antenna.

14. The aircraft of claim 1, further comprising:
a memory (116) configured to store flight path data;
the flight controller, the flight controller configured to control the wings based on a flight path (342) indicated by the flight path data, wherein the flight path comprises a loop, a circle, an ellipse, a figure eight, or a combination thereof; and
the feeder link antenna, the feeder link antenna configured to receive beamforming weights, wherein the first planar phased array antenna and the second planar phased array antenna generate a plurality of beams based on the received beamforming weights.

15. A method (700) for communicating via a phased array antenna system, the method comprising:
receiving (702), via a first planar phased array antenna (132) fixedly attached to an aircraft (1202), a first signal corresponding to a communication link (336); and
transmitting (704), via a second planar phased array antenna (134) fixedly attached to the aircraft, a second signal corresponding to the communication link, wherein a first normal vector (220) of the first planar phased array antenna is not parallel to a second normal vector (222) of the second planar phased array antenna;
receiving (952), by a feeder link antenna (110), flight path data associated with a flight path via a communication uplink;
operating (954), by a flight controller (112), the aircraft based on the flight path data; and
receiving (956) service coverage data associated with the flight path via the communication uplink.

16. The method of claim 15, wherein at least one of:
the first signal corresponding to the communication link is received from a first user device (322-328) or a first ground station (306, 312-318); and
the second signal corresponding to the communication link is transmitted to a second user device (322-328) or a second ground station (306, 312-318).

17. The method of claim 15, further comprising:
generating (802) a first beam (412), by a first set of elements of the first planar phased array antenna (212), based on an altitude of the aircraft, an attitude of the aircraft, a first portion of a service coverage area, the flight path, or a combination thereof, wherein the first signal is received via the first beam; and
generating (804) a second beam (414), by a second set of elements of the second planar phased array antenna (216), based on the altitude, the attitude, a second portion of the service coverage area, the flight path, or a combination thereof, wherein the second signal is transmitted via the second beam.

18. The method of claim 17, further comprising:
adjusting (806) a shape of the first beam based on the altitude, the attitude, the first portion of the service coverage area, the flight path, or a combination thereof; and
adjusting (808) a shape of the second beam based on the altitude, the attitude, the second portion of the service coverage area, the flight path, or a combination thereof.

19. The method of claim 18,
wherein the first beam is generated based on first beamforming weights (1252) and supports reception and transmission of signals corresponding to the communication link for the first portion of the service coverage area,
wherein the first beamforming weights are determined based on a first altitude of the aircraft, a first attitude of the aircraft, a location of the first portion of the service coverage area relative to the aircraft, or a combination thereof, and
wherein adjusting the shape of the first beam comprises:
receiving, (902) from one or more sensors (114) of the aircraft, a second altitude of the aircraft, a second attitude of the aircraft, or a combination thereof;
determining (904) second beamforming weights (1254) to provide an adjusted first beam to the first portion of the service coverage area based on the second altitude, the second attitude, the location of the first portion of the service coverage area relative to the aircraft, or a combination thereof; and
generating (906) the adjusted first beam based on the second beamforming weights, wherein the first beam has a first shape that is different from a second shape of the adjusted first beam.

20. The method of claim 15, wherein a first set of elements of the first planar phased array antenna provides the communication link for a particular portion of a service coverage area, and wherein providing the communication link includes receiving and transmitting signals corresponding to the communication link, and further comprising executing a beam hand-off for the first planar phased array antenna comprising:
ceasing providing (1002), by the first set of elements, the communication link for the particular portion of the service coverage area; and
providing (1004), by a second set of elements of the first planar phased array antenna, the communication link for the particular portion of the service coverage area.

21. The method of claim 15, further comprising at least one of:
performing (1052, 1054) a beam hand-off from a first set of elements to a second set of elements at a packet boundary of the communication link, wherein the second set of elements generates a second beam to provide the communication link for a particular portion of a service coverage area before the first set of elements ceases generation of a first beam that provided the communication link for the particular portion of the service coverage area; or
performing (1052, 1056) a beam hand-off from the first set of elements to the second set of elements a the packet boundary of the communication link, wherein the first set of elements ceases generation of the first beam that provided the communication link for the particular portion of the service coverage area before the second set of elements generates the second beam to provide the communication link for the particular portion of the service coverage area.

22. A vehicle comprising:
a plurality of exterior surfaces (122, 124, 230, 232, 234, 1246, 1248);
a plurality of phased array antennas (106, 132, 134, 210-218, 260) coupled to a transceiver (104) and fixedly attached to at least one of the plurality of exterior surfaces, the plurality of phased array antennas including a first phased array antenna (132) having a first normal vector (220) and a second phased array antenna (134) having a second normal vector (222), wherein the first normal vector is not parallel to the second normal vector, wherein the first phased array antenna (132) is configured to receive (702) a first signal corresponding to a communication link (336), and wherein the second phased array antenna (134) is configured to transmit (704) a second signal corresponding to the communication link; and
the transceiver, the transceiver configured to couple to a feeder link antenna (110), the feeder link antenna configured to receive (956) service coverage data associated with a flight path via a communication uplink.

23. The vehicle of claim 22, wherein the vehicle corresponds to a helicopter, a commercial aircraft, a private plane, or a blimp, wherein the first phased array antenna comprises a conformal phased array antenna (262), wherein the conformal phased array antenna has a first shape that corresponds to a second shape of a portion of a particular exterior surface (122, 124) of the plurality of exterior surfaces, and wherein the conformal phased array antenna has multiple normal vectors (264, 266).

24. The vehicle of claim 22, further comprising a communication controller (108) coupled to the transceiver and to the plurality of phased array antennas, the communication controller configured to:
cause each phased array antenna of the plurality of phased array antennas to generate multiple beams; and
adjust beamforming weights (1252, 1254) of the multiple beams to align each beam of the multiple beams with a corresponding portion of a service coverage area (602).

25. The vehicle of claim 22, wherein the feeder link antenna is further configured to receive (952) flight path data associated with the flight path via the communication uplink (110), wherein a flight controller (112) is configured to operate the vehicle based on the flight path data.

\* \* \* \* \*